(12) United States Patent
Sadek

(10) Patent No.: US 9,801,115 B2
(45) Date of Patent: Oct. 24, 2017

(54) ROBUST INTER-RADIO ACCESS TECHNOLOGY OPERATIONS IN UNLICENSED SPECTRUM

(71) Applicant: QUALCOMM Incorporated, San Diego, CA (US)

(72) Inventor: Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 419 days.

(21) Appl. No.: 14/475,033

(22) Filed: Sep. 2, 2014

(65) Prior Publication Data

US 2015/0063099 A1 Mar. 5, 2015

Related U.S. Application Data

(60) Provisional application No. 61/873,599, filed on Sep. 4, 2013.

(51) Int. Cl.
*G01R 31/08* (2006.01)
*H04W 4/00* (2009.01)
(Continued)

(52) U.S. Cl.
CPC .......... *H04W 40/16* (2013.01); *H04L 1/0015* (2013.01); *H04L 1/20* (2013.01); *H04L 5/0073* (2013.01);
(Continued)

(58) Field of Classification Search
CPC .................................................. H04W 40/16
See application file for complete search history.

(56) References Cited

U.S. PATENT DOCUMENTS 8,494,580 B1 7/2013 Weinrib et al.
9,253,778 B2 * 2/2016 Ye ..................... H04W 72/0453
(Continued)

FOREIGN PATENT DOCUMENTS

FR 2780593 A1 12/1999
WO 2007149394 A2 12/2007
(Continued)

OTHER PUBLICATIONS

Deckert T., et al., "Superposed Signaling Option for Bandwidth Efficient Wireless LANs", Internet Citation, Sep. 15, 2004 (Sep. 15, 2004), pp. 1-6, XP002558039, Retrieved from the Internet: URL: http://wwwmns.ifn.et.tu- dresden.dejpublications/2004/Deckert T WPMC 04.pdf.
(Continued)

*Primary Examiner* — Gerald Smarth
(74) *Attorney, Agent, or Firm* — Muncy, Geissler, Olds & Lowe, P.C.

(57) ABSTRACT

Systems and methods are disclosed for mitigating interference between Radio Access Technologies (RATs) sharing operating spectrum in an unlicensed band of radio frequencies. The mitigation may comprise, for example, identifying an upcoming signal transmission associated with a first RAT, with the signal transmission being scheduled for transmission on the shared operating spectrum during a transmission period. The signal transmission may be classified with respect to a protection status. Based on the protection status, a channel reservation message may be transmitted that is associated with a second RAT to reserve at least a portion of the shared operating spectrum for at least a portion of the transmission period.

28 Claims, 16 Drawing Sheets

(51) Int. Cl.

| | | |
|---|---|---|
| *H04W 40/16* | (2009.01) | |
| *H04W 16/14* | (2009.01) | |
| *H04L 5/00* | (2006.01) | |
| *H04W 24/08* | (2009.01) | |
| *H04W 52/24* | (2009.01) | |
| *H04W 72/04* | (2009.01) | |
| *H04W 74/08* | (2009.01) | |
| *H04L 1/00* | (2006.01) | |
| *H04L 1/20* | (2006.01) | |
| *H04J 11/00* | (2006.01) | |
| *H04W 16/16* | (2009.01) | |
| *H04W 88/06* | (2009.01) | |
| *H04W 88/10* | (2009.01) | |
| *H04W 84/04* | (2009.01) | |
| *H04W 72/12* | (2009.01) | |

(52) U.S. Cl.
CPC .......... *H04W 16/14* (2013.01); *H04W 24/08* (2013.01); *H04W 52/241* (2013.01); *H04W 52/243* (2013.01); *H04W 52/244* (2013.01); *H04W 72/048* (2013.01); *H04W 72/0453* (2013.01); *H04W 74/0816* (2013.01); *H04J 11/0023* (2013.01); *H04W 16/16* (2013.01); *H04W 72/1215* (2013.01); *H04W 84/045* (2013.01); *H04W 88/06* (2013.01); *H04W 88/10* (2013.01)

(56) References Cited

U.S. PATENT DOCUMENTS

| | | | |
|---|---|---|---|
| 2004/0162617 A1* | 8/2004 | Zucherman | A61B 17/7068 623/17.11 |
| 2008/0233967 A1 | 9/2008 | Montojo et al. | |
| 2009/0262785 A1 | 10/2009 | Wilhelmsson | |
| 2010/0046440 A1 | 2/2010 | Singh | |
| 2010/0091670 A1 | 4/2010 | Uln et al. | |
| 2010/0322287 A1 | 12/2010 | Truong et al. | |
| 2011/0110251 A1 | 5/2011 | Krishnamurthy et al. | |
| 2011/0170424 A1 | 7/2011 | Safavi | |
| 2011/0205984 A1 | 8/2011 | Lee et al. | |
| 2011/0244904 A1* | 10/2011 | Sagae | H04W 48/10 455/507 |
| 2012/0120892 A1* | 5/2012 | Freda | H04W 8/005 370/329 |
| 2012/0140656 A1 | 6/2012 | Wigren et al. | |
| 2012/0207040 A1* | 8/2012 | Comsa | H04W 72/1215 370/252 |
| 2012/0264388 A1 | 10/2012 | Guo et al. | |
| 2013/0065533 A1 | 3/2013 | Cai et al. | |
| 2013/0142059 A1* | 6/2013 | Di Girolamo | H04L 12/66 370/252 |
| 2013/0143502 A1 | 6/2013 | Kazmi et al. | |
| 2013/0195072 A1* | 8/2013 | Zhu | H04W 72/042 370/330 |
| 2013/0315152 A1 | 11/2013 | Ratasuk et al. | |
| 2013/0322279 A1 | 12/2013 | Chincholi et al. | |
| 2013/0336156 A1 | 12/2013 | Wei et al. | |
| 2013/0337821 A1 | 12/2013 | Clegg | |
| 2014/0133371 A1 | 5/2014 | Park et al. | |
| 2015/0063148 A1 | 3/2015 | Sadek | |

FOREIGN PATENT DOCUMENTS

| | | |
|---|---|---|
| WO | 2010105232 A1 | 9/2010 |
| WO | 2012026857 A1 | 3/2012 |
| WO | 2012135491 A1 | 10/2012 |
| WO | 2013019177 A1 | 2/2013 |
| WO | 2013112983 A2 | 8/2013 |

OTHER PUBLICATIONS

International Search Report and Written Opinion—PCT/US2014/053926—ISA/EPO—Nov. 10, 2014.

Mediatek: "Discussion on In-device Coexistence Interference Avoidance", 3GPP Draft; R2-103644_Disc on Multi-Radio Coexistence_Ys, 3rd Generation Partnership Project (3GPP), Mobile Competence Centre ; 650, Route Des Lucioles ; F-06921 Sophia-Antipolis Cedex ; France, ——vol. RAN WG2, No. Stockholm, Sweden; Jun. 28, 2010, Jun. 22, 2010 (Jun. 22, 2010), XP050451165, [retrieved on Jun. 22, 2010].

* cited by examiner

ROBUST INTER-RADIO ACCESS TECHNOLOGY OPERATIONS IN UNLICENSED SPECTRUM

CROSS-REFERENCE TO RELATED APPLICATIONS

The present Application for Patent claims the benefit of U.S. Provisional Application No. 61/873,599, entitled "METHODS FOR ROBUST LTE OPERATIONS IN UNLICENSED CHANNELS," filed Sep. 4, 2013, assigned to the assignee hereof, and expressly incorporated herein by reference in its entirety.

REFERENCE TO CO-PENDING APPLICATIONS FOR PATENT

The present Application for Patent is also related to the following co-pending U.S. Patent Application: "ROBUST INTER-RADIO ACCESS TECHNOLOGY OPERATIONS IN UNLICENSED SPECTRUM," having Ser. No. 14/475,122, filed concurrently herewith, assigned to the assignee hereof, and expressly incorporated herein by reference in its entirety.

INTRODUCTION

Aspects of this disclosure relate generally to telecommunications, and more particularly to co-existence between wireless Radio Access Technologies (RATs) and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Third Generation Partnership Project (3GPP), 3GPP Long Term Evolution (LTE), Ultra Mobile Broadband (UMB), Evolution Data Optimized (EV-DO), Institute of Electrical and Electronics Engineers (IEEE), etc.

In cellular networks, "macro cell" base stations provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience.

To improve indoor or other specific geographic coverage, such as for residential homes and office buildings, additional "small cell," typically low-power base stations have recently begun to be deployed to supplement conventional macro networks. Small cell base stations may also provide incremental capacity growth, richer user experience, and so on.

Recently, small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other RATs that typically utilize the same unlicensed bands, most notably IEEE 802.11x WLAN technologies generally referred to as "Wi-Fi."

One approach to interference management for such a co-existence environment is to select a "clean" channel for small cell LTE operations that is free of interference from/to Wi-Fi devices. However, a clean channel may not always be available. There therefore remains a need for improved co-existence techniques for various devices operating in the increasingly crowded unlicensed frequency spectrum.

SUMMARY

Systems and methods for co-existence in unlicensed spectrum are disclosed.

A method of communication for mitigating interference between Radio Access Technologies (RATs) sharing operating spectrum in an unlicensed band of radio frequencies is disclosed. The method may comprise, for example: identifying an upcoming signal transmission associated with a first RAT, wherein the signal transmission is scheduled for transmission on the shared operating spectrum during a transmission period; classifying the signal transmission with respect to a protection status; and transmitting, based on the protection status, a channel reservation message associated with a second RAT to reserve at least a portion of the shared operating spectrum for at least a portion of the transmission period.

An apparatus for communication for mitigating interference between RATs sharing operating spectrum in an unlicensed band of radio frequencies is also disclosed. The apparatus may comprise, for example, a processor and a transceiver. The processor may be configured to identify an upcoming signal transmission associated with a first RAT, wherein the signal transmission is scheduled for transmission on the shared operating spectrum during a transmission period, and to classify the signal transmission with respect to a protection status. The transceiver may be configured to transmit, based on the protection status, a channel reservation message associated with a second RAT to reserve at least a portion of the shared operating spectrum for at least a portion of the transmission period.

Another apparatus for communication for mitigating interference between RATs sharing operating spectrum in an unlicensed band of radio frequencies is also disclosed. The apparatus may comprise, for example: means for identifying an upcoming signal transmission associated with a first RAT, wherein the signal transmission is scheduled for transmission on the shared operating spectrum during a transmission period; means for classifying the signal transmission with respect to a protection status; and means for transmitting, based on the protection status, a channel reservation message associated with a second RAT to reserve at least a portion of the shared operating spectrum for at least a portion of the transmission period.

A computer-readable medium is also disclosed that comprises instructions, which, when executed by a processor, cause the processor to perform operations for mitigating interference between RATs sharing operating spectrum in an unlicensed band of radio frequencies. The computer-readable medium may comprise, for example: instructions for identifying an upcoming signal transmission associated with a first RAT, wherein the signal transmission is scheduled for transmission on the shared operating spectrum during a transmission period; instructions for classifying the signal transmission with respect to a protection status; and instructions for transmitting, based on the protection status, a channel reservation message associated with a second RAT to reserve at least a portion of the shared operating spectrum for at least a portion of the transmission period.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
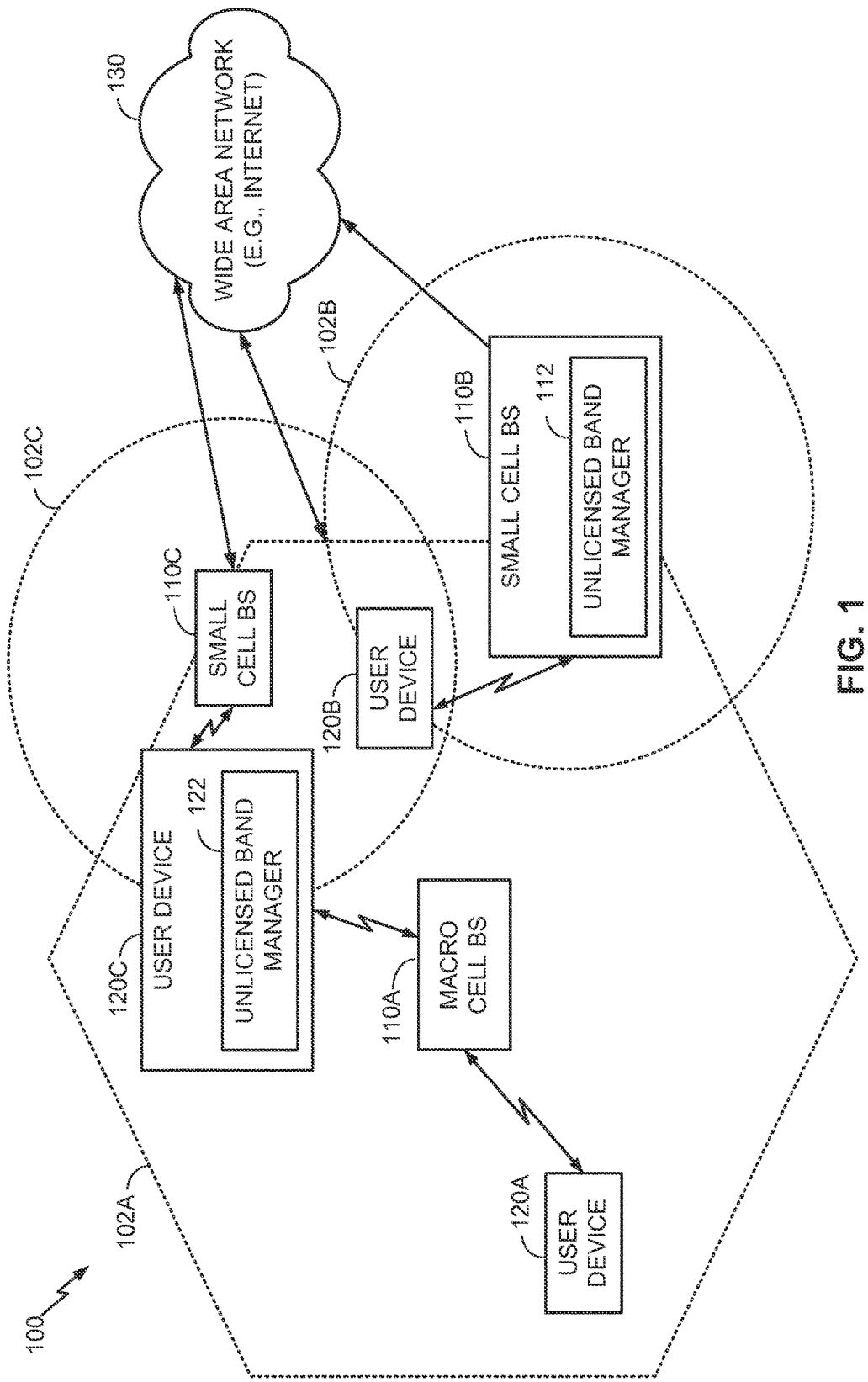
FIG. 1 illustrates an example mixed-deployment wireless communication system including macro cell base stations and small cell base stations.

The present disclosure relates generally to techniques for robust operation of base stations and user devices in the unlicensed band. This may be achieved by protecting certain transmissions and receptions in accordance with a one Radio Access Technology (RAT) (e.g., cellular signaling such as Long Term Evolution (LTE)) from interference due to another, native RAT (e.g., Wi-Fi) sharing the same operating spectrum on the unlicensed band. For example, the base station or user device may protect important transmissions by sending a channel reservation message defined for the native RAT to neighboring base stations (e.g., Wi-Fi Access Points), neighboring user devices (e.g., Wi-Fi Subscriber Stations (STAs), etc., to reserve the communication medium and prevent the native RAT from transmitting during transmissions or receptions of the important signaling. Such channel reservations messages include Clear-to-Send-to-Self (CTS2S), Request-to-Send (RTS), and Clear-to-Send (CTS) messages or the like. Such a protection mechanism may be dynamically adapted to fit current signaling conditions, both in relation to the protected RAT and the native, interfering RAT.

The present disclosure also relates to other techniques for robust operation of base stations and user devices in the unlicensed band. For example, in some aspects, robust operation may include actions by a base station to boost transmission power or control the number of symbol-tones or OFDM symbols used for certain transmissions, to increase the likelihood of success reception by user devices. In other aspects, filters such as Kalman filters may be used to improve signals received in the unlicensed band. In still other aspects, techniques are disclosed for modifying pre-existing (e.g., Wi-Fi) front end circuitry for use with other RATs in the unlicensed band, in a manner that helps to mitigate traditional drawbacks such as different transmit power ranges.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 illustrates an example mixed-deployment wireless communication system, in which small cell base stations are deployed in conjunction with and to supplement the coverage of macro cell base stations. As used herein, small cells generally refer to a class of low-powered base stations that may include or be otherwise referred to as femto cells, pico cells, micro cells, etc. As noted in the background above, they may be deployed to provide improved signaling, incremental capacity growth, richer user experience, and so on.

The illustrated wireless communication system 100 is a multiple-access system that is divided into a plurality of cells 102 and configured to support communication for a number of users. Communication coverage in each of the cells 102 is provided by a corresponding base station 110, which interacts with one or more user devices 120 via DownLink (DL) and/or UpLink (UL) connections. In general, the DL corresponds to communication from a base station to a user device, while the UL corresponds to communication from a user device to a base station.

As will be described in more detail below, these different entities may be variously configured in accordance with the teachings herein to provide or otherwise support the unlicensed band co-existence techniques discussed briefly above. For example, one or more of the small cell base stations 110 may include an unlicensed band management module 112, while one or more of the user devices 120 may include an unlicensed band management module 122.

As used herein, the terms "user device" and "base station" are not intended to be specific or otherwise limited to any particular Radio Access Technology (RAT), unless otherwise noted. In general, such user devices may be any wireless communication device (e.g., a mobile phone, router, personal computer, server, etc.) used by a user to communicate over a communications network, and may be alternatively referred to in different RAT environments as an Access Terminal (AT), a Mobile Station (MS), a Subscriber Station (STA), a User Equipment (UE), etc. Similarly, a base station may operate according to one of several RATs in communication with user devices depending on the network in which it is deployed, and may be alternatively referred to as an Access Point (AP), a Network Node, a NodeB, an evolved NodeB (eNB), etc. In addition, in some systems a base station may provide purely edge node signaling functions while in other systems it may provide additional control and/or network management functions.

Returning to FIG. 1, the different base stations 110 include an example macro cell base station 110A and two example small cell base stations 110B, 110C. The macro cell base station 110A is configured to provide communication coverage within a macro cell coverage area 102A, which may cover a few blocks within a neighborhood or several square miles in a rural environment. Meanwhile, the small cell base stations 110B, 110C are configured to provide communication coverage within respective small cell coverage areas 102B, 102C, with varying degrees of overlap existing among the different coverage areas. In some systems, each cell may be further divided into one or more sectors (not shown).

Turning to the illustrated connections in more detail, the user device 120A may transmit and receive messages via a wireless link with the macro cell base station 110A, the message including information related to various types of communication (e.g., voice, data, multimedia services, associated control signaling, etc.). The user device 120B may similarly communicate with the small cell base station 110B via another wireless link, and the user device 120C may similarly communicate with the small cell base station 110C via another wireless link. In addition, in some scenarios, the user device 120C, for example, may also communicate with the macro cell base station 110A via a separate wireless link in addition to the wireless link it maintains with the small cell base station 110C.

As is further illustrated in FIG. 1, the macro cell base station 110A may communicate with a corresponding wide area or external network 130, via a wired link or via a wireless link, while the small cell base stations 110B, 110C may also similarly communicate with the network 130, via their own wired or wireless links. For example, the small cell base stations 110B, 110C may communicate with the network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The network 130 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 130 includes network variations such as the public Internet, a private network within the Internet, a secure network within the Internet, a private network, a public network, a value-added network, an intranet, and the like. In certain systems, the network 130 may also comprise a Virtual Private Network (VPN).

Accordingly, it will be appreciated that the macro cell base station 110A and/or either or both of the small cell base stations 110B, 110C may be connected to the network 130 using any of a multitude of devices or methods. These connections may be referred to as the "backbone" or the "backhaul" of the network, and may in some implementations be used to manage and coordinate communications between the macro cell base station 110A, the small cell base station 110B, and/or the small cell base station 110C. In this way, as a user device moves through such a mixed communication network environment that provides both macro cell and small cell coverage, the user device may be served in certain locations by macro cell base stations, at other locations by small cell base stations, and, in some scenarios, by both macro cell and small cell base stations.

For their wireless air interfaces, each base station 110 may operate according to one of several RATs depending on the network in which it is deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These documents are publicly available.

For illustration purposes, an example downlink and uplink frame structure for an LTE signaling scheme is described below with reference to FIGS. 2-3.

Figure 2:
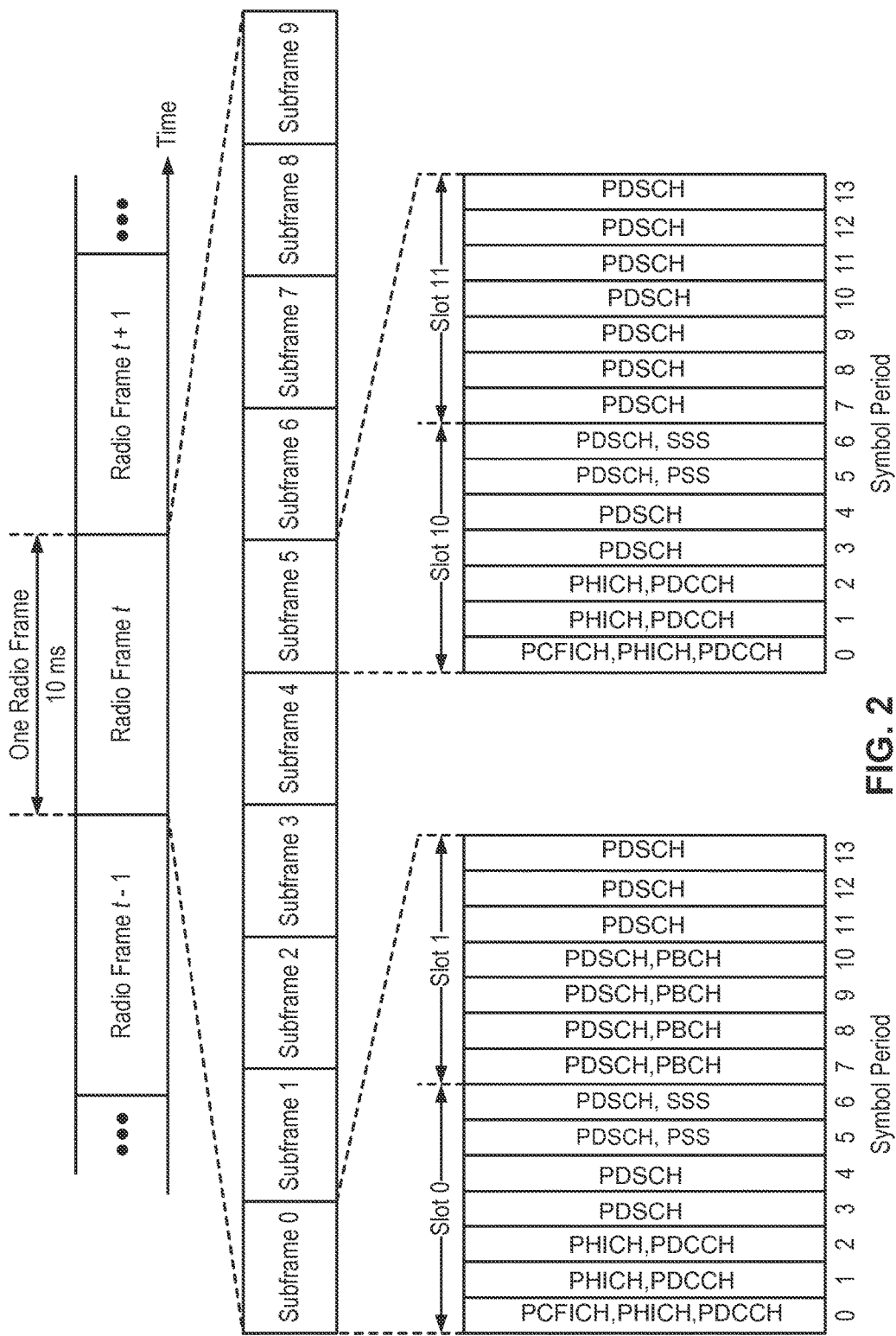
FIG. 2 is a block diagram illustrating an example downlink frame structure for LTE communications.

FIG. 2 is a block diagram illustrating an example downlink frame structure for LTE communications. In LTE, the base stations 110 of FIG. 1 are generally referred to as eNBs and the user devices 120 are generally referred to as UEs.

The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 5 and 6, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

Reference signals are transmitted during the first and fifth symbol periods of each slot when the normal cyclic prefix is used and during the first and fourth symbol periods when the extended cyclic prefix is used. For example, the eNB may send a Cell-specific Reference Signal (CRS) for each cell in the eNB on all component carriers. The CRS may be sent in symbols 0 and 4 of each slot in case of the normal cyclic prefix, and in symbols 0 and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into Resource Element Groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 3:
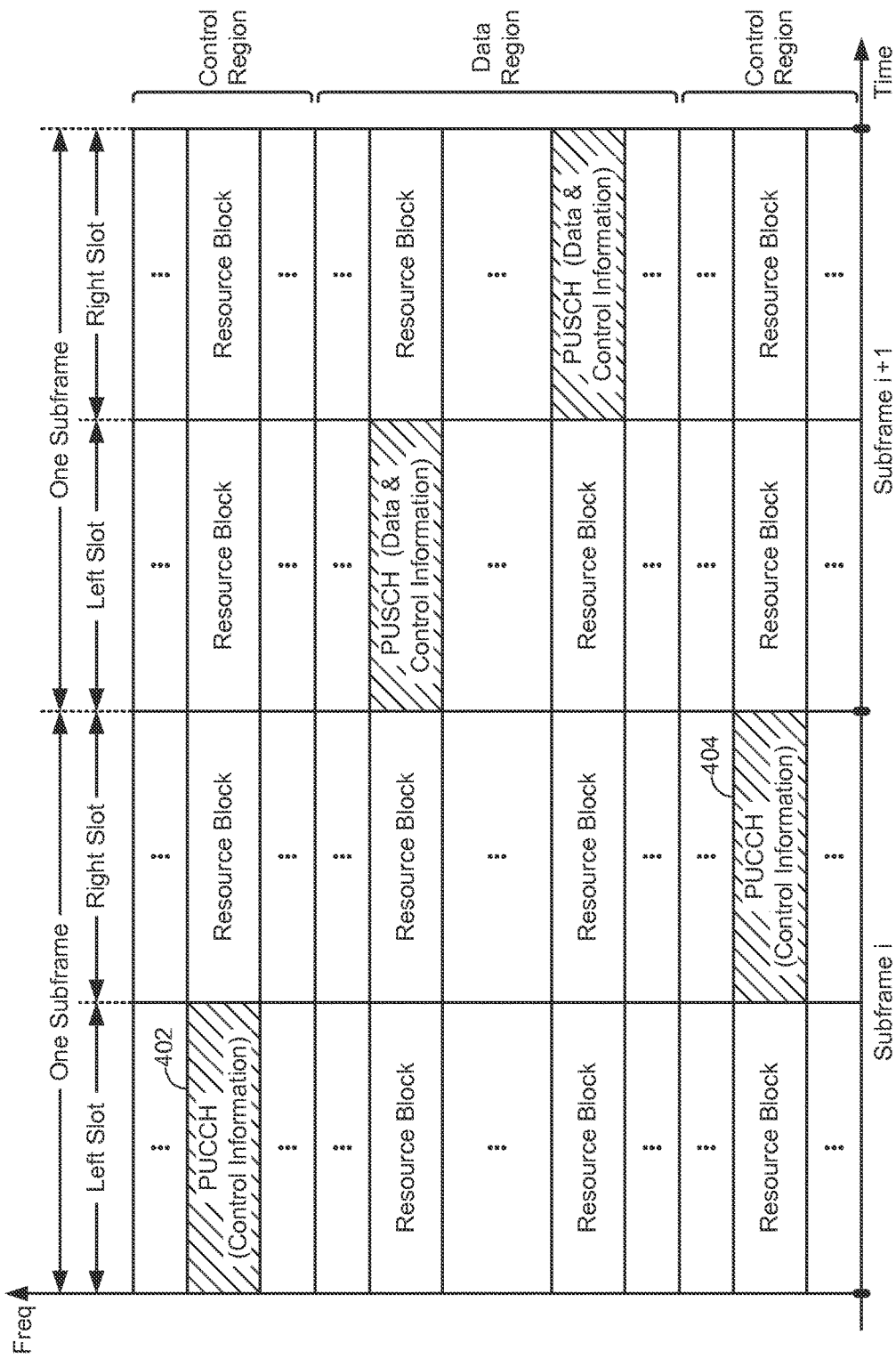
FIG. 3 is a block diagram illustrating an example uplink frame structure for LTE communications.

FIG. 3 is a block diagram illustrating an example uplink frame structure for LTE communications. The available resource blocks (which may be referred to as RBs) for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3.

Returning to FIG. 1, cellular systems such as LTE are typically confined to one or more licensed frequency bands that have been reserved for such communications (e.g., by a government entity such as the Federal Communications Commission (FCC) in the United States). However, certain communication systems, in particular those employing small cell base stations as in the design of FIG. 1, have extended cellular operations into unlicensed frequency bands such as the Unlicensed National Information Infrastructure (U-NII) band used by Wireless Local Area Network (WLAN) technologies. For illustration purposes, the description below may refer in some respects to an LTE system operating on an unlicensed band by way of example when appropriate, although it will be appreciated that such descriptions are not intended to exclude other cellular communication technologies. LTE on an unlicensed band may also be referred to herein as LTE/LTE-Advanced in unlicensed spectrum, or simply LTE in the surrounding context. With reference to FIGS. 2-3 above, the PSS, SSS, CRS, PBCH, PUCCH, and PUSCH in LTE on an unlicensed band are otherwise the same or substantially the same as in the LTE standard described in 3GPP TS 36.211, entitled "Evolved Universal Terrestrial Radio Access (E-UTRA); Physical Channels and Modulation," which is publicly available.

The unlicensed spectrum may be employed by cellular systems in different ways. For example, in some systems, the unlicensed spectrum may be employed in a standalone configuration, with all carriers operating exclusively in an unlicensed portion of the wireless spectrum (e.g., LTE Standalone). In other systems, the unlicensed spectrum may be employed in a manner that is supplemental to licensed band operation by utilizing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding user (e.g., an anchor licensed carrier in LTE SDL or a designated one of the unlicensed carriers in LTE Standalone) and the remaining carriers serving as respective Secondary Cells (SCells). In this way, the PCell may provide a Frequency Division Duplexed (FDD) pair of downlink and uplink carriers (licensed or unlicensed), with each SCell providing additional downlink capacity as desired.

The extension of small cell operation into unlicensed frequency bands such as the U-NII (5 GHz) band may therefore be implemented in a variety of ways and increase the capacity of cellular systems such as LTE. As discussed briefly in the background above, however, it may also encroach on the operations of other "native" RATs that typically utilize the same unlicensed band, most notably IEEE 802.11x WLAN technologies generally referred to as "Wi-Fi."

In some small cell base station and/or user device designs, the small cell base station and/or user device may include such a native RAT radio co-located with its cellular radio.

Figure 4:
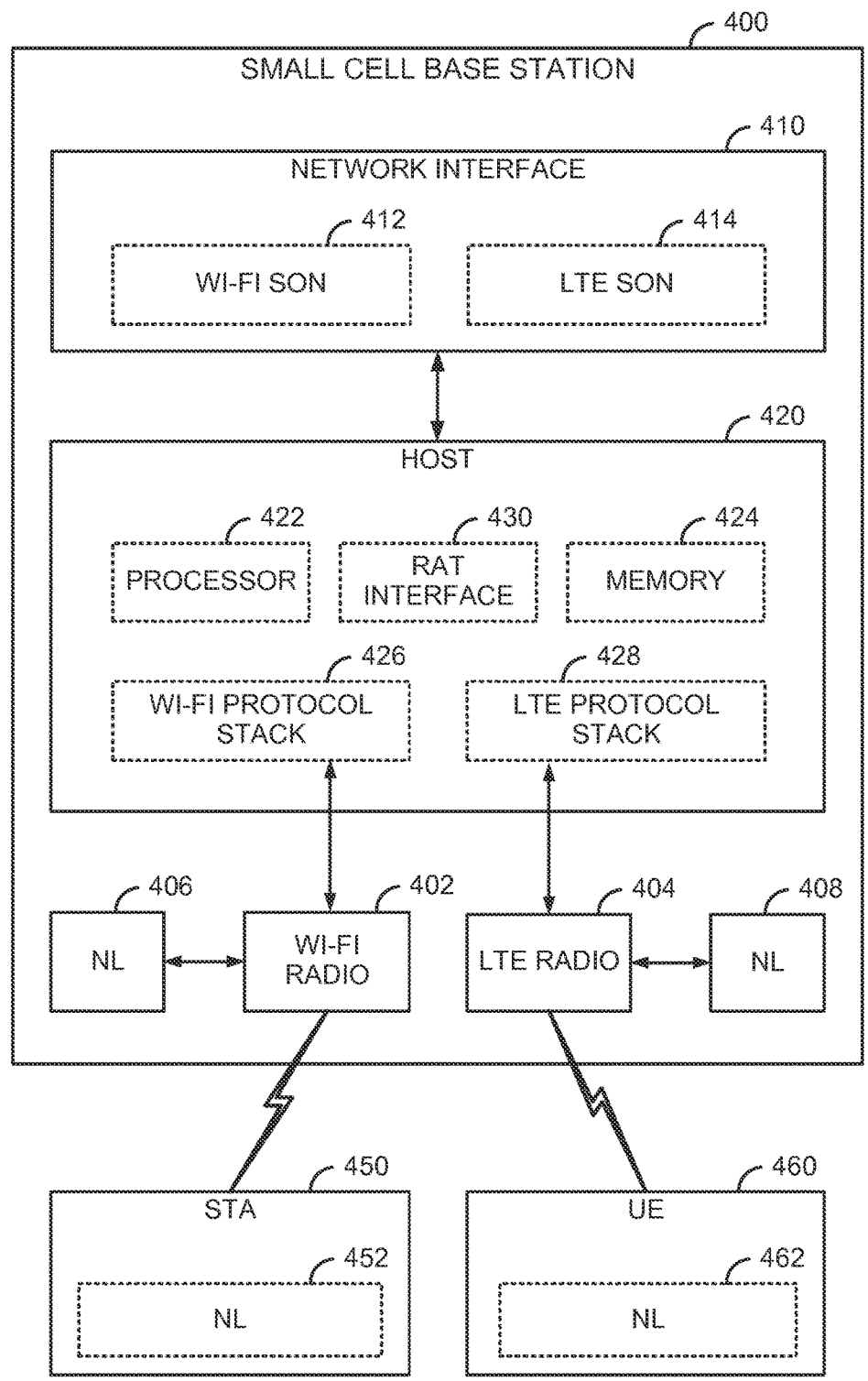
FIG. 4 illustrates an example small cell base station with co-located radio components (e.g., LTE and Wi-Fi) configured for unlicensed spectrum operation.

FIG. 4 illustrates an example small cell base station with co-located radio components configured for unlicensed spectrum operation. The small cell base station 400 may correspond, for example, to one of the small cell base stations 110B, 110C illustrated in FIG. 1. In this example, the small cell base station 400 is configured to provide a WLAN air interface (e.g., in accordance with an IEEE 802.11x protocol) in addition to a cellular air interface (e.g., in accordance with an LTE protocol). For illustration purposes, the small cell base station 400 is shown as including an 802.11x radio component/module (e.g., transceiver) 402 co-located with an LTE radio component/module (e.g., transceiver) 404.

As used herein, the term co-located (e.g., radios, base stations, transceivers, etc.) may include in accordance with various aspects, one or more of, for example: components that are in the same housing; components that are hosted by the same processor; components that are within a defined distance of one another; and/or components that are connected via an interface (e.g., an Ethernet switch) where the interface meets the latency requirements of any required inter-component communication (e.g., messaging). In some designs, certain advantages may be achieved by adding a radio component of the native unlicensed band RAT of interest to a given cellular small cell base station without that base station necessarily providing corresponding communication access via the native unlicensed band RAT (e.g., adding a Wi-Fi chip or similar circuitry to an LTE small cell base station). If desired, a low functionality Wi-Fi circuit may be employed to reduce costs (e.g., a Wi-Fi receiver simply providing low-level sniffing or a Wi-Fi transmitter simply providing message transmission).

Returning to FIG. 4, the Wi-Fi radio 402 and the LTE radio 404 may perform monitoring of one or more channels (e.g., on a corresponding carrier frequency) to perform various corresponding operating channel or environment measurements (e.g., CQI, RSSI, RSRP, or other RLM measurements) using corresponding Network/Neighbor Listen (NL) modules 406 and 408, respectively, or any other suitable component(s).

The small cell base station 400 may communicate with one or more user devices via the Wi-Fi radio 402 and the LTE radio 404, illustrated as an STA 450 and a UE 460, respectively. Similar to the Wi-Fi radio 402 and the LTE radio 404, the STA 450 includes a corresponding NL module 452 and the UE 460 includes a corresponding NL module 462 for performing various operating channel or environment measurements, either independently or under the direction of the Wi-Fi radio 402 and the LTE radio 404, respectively. In this regard, the measurements may be retained at the STA 450 and/or the UE 460, or reported to the Wi-Fi radio 402 and the LTE radio 404, respectively, with or without any pre-processing being performed by the STA 450 or the UE 460.

While FIG. 4 shows a single STA 450 and a single UE 460 for illustration purposes, it will be appreciated that the small cell base station 400 can communicate with multiple STAs and/or UEs. Additionally, while FIG. 4 illustrates one type of user device communicating with the small cell base station 400 via the Wi-Fi radio 402 (i.e., the STA 450) and another type of user device communicating with the small cell base station 400 via the LTE radio 404 (i.e., the UE 460), it will be appreciated that a single user device (e.g., a smartphone) may be capable of communicating with the small cell base station 400 via both the Wi-Fi radio 402 and the LTE radio 404, either simultaneously or at different times.

As is further illustrated in FIG. 4, the small cell base station 400 may also include a network interface 410, which may include various components for interfacing with corresponding network entities (e.g., Self-Organizing Network (SON) nodes), such as a component for interfacing with a Wi-Fi SON 412 and/or a component for interfacing with an LTE SON 414. The small cell base station 400 may also include a host 420, which may include one or more general purpose controllers or processors 422 and memory 424 configured to store related data and/or instructions. The host 420 may perform processing in accordance with the appropriate RAT(s) used for communication (e.g., via a Wi-Fi protocol stack 426 and/or an LTE protocol stack 428), as well as other functions for the small cell base station 400. In particular, the host 420 may further include a RAT interface 430 (e.g., a bus or the like) that enables the radios 402 and 404 to communicate with one another via various message exchanges.

Figure 5:
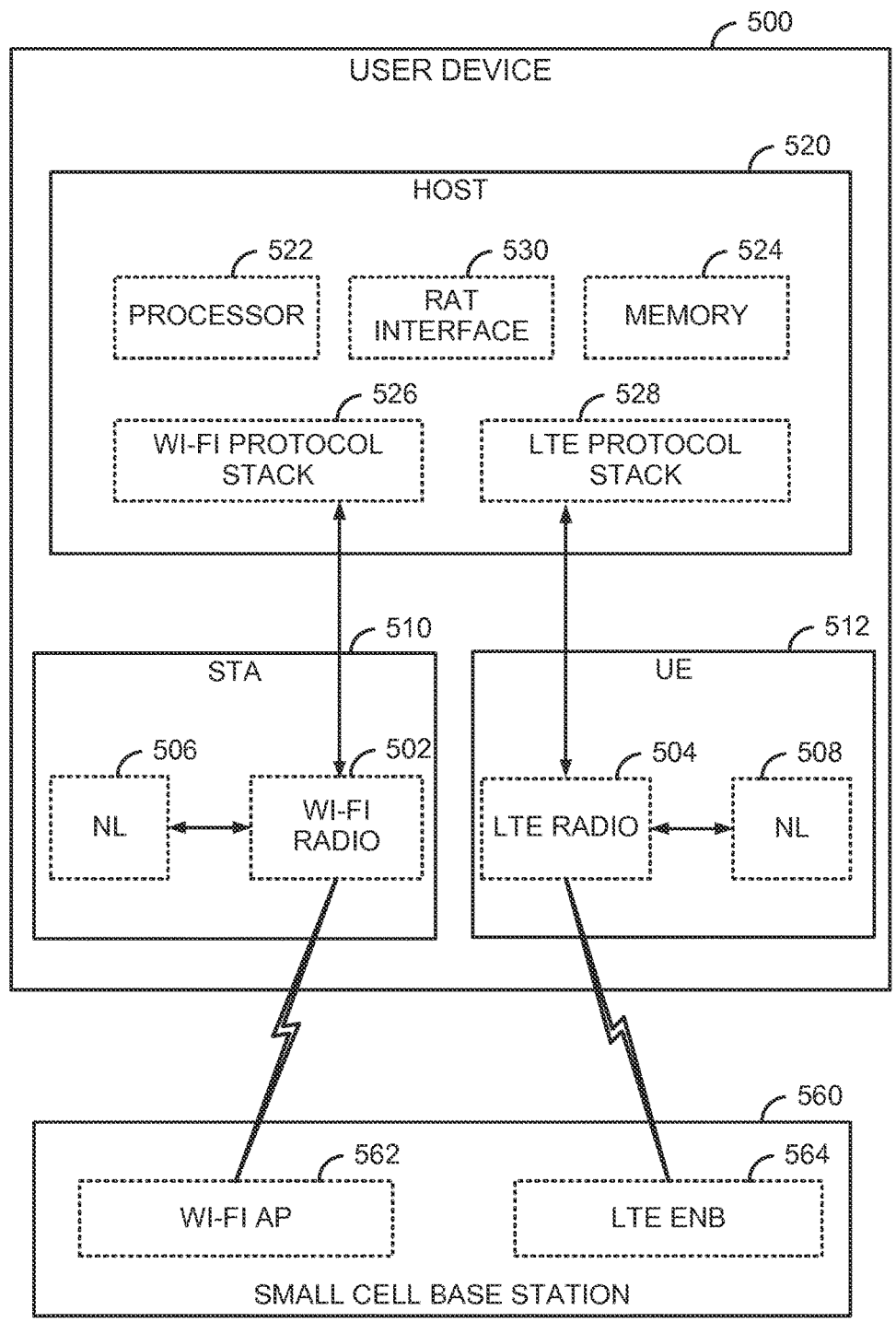
FIG. 5 illustrates an example user device with co-located radio components configured for unlicensed spectrum operation and measurement reporting.

FIG. 5 illustrates an example user device with co-located radio components configured for unlicensed spectrum operation and measurement reporting. The user device 500 may correspond, for example, to one of the user devices 120 illustrated in FIG. 1. In this example, the user device 500 is configured to operate over a WLAN air interface (e.g., in accordance with an IEEE 802.11x protocol) as an STA 510 in addition to a cellular air interface (e.g., in accordance with an LTE protocol) as a UE 512. For illustration purposes, the user device 500 is shown as including an 802.11x Wi-Fi radio component/module (e.g., transceiver) 502 co-located with an LTE radio component/module (e.g., transceiver) 504. The Wi-Fi radio 502 and the LTE radio 504 may perform monitoring of one or more channels (e.g., on a corresponding carrier frequency) to perform various corresponding operating channel or environment measurements (e.g., CQI, RSSI, RSRP, or other RLM measurements) using corresponding NL modules 506 and 508, respectively, or any other suitable component(s).

The user device 500 may communicate with a corresponding small cell base station 560 via (i) a Wi-Fi link between the Wi-Fi radio 502 and an AP 562 provided by the small cell base station 560 and (ii) an LTE link between the LTE radio 504 and an eNB 564 provided by the small cell base station 560.

As is further illustrated in FIG. 5, the user device 500 may also include a host 520, which may include one or more general purpose controllers or processors 522 and memory 524 configured to store related data and/or instructions. The host 520 may perform processing in accordance with the appropriate RAT(s) used for communication (e.g., via a Wi-Fi protocol stack 526 and/or an LTE protocol stack 528), as well as other functions for the user device 500. In particular, the host 520 may further include a RAT interface 530 (e.g., a bus or the like) that enables the radios 502 and 504 to communicate with one another via various message exchanges.

Several enhancements are described herein for better facilitating the use of cellular RATs such as LTE on unlicensed bands shared with native RATs such as Wi-Fi. Using LTE in the unlicensed band may provide advantages over Wi-Fi, including improved coverage, capacity, mobility, and Quality of Service (QoS). With respect to coverage, LTE may support larger transmission signal delay spreads. LTE may operate at a lower signal-to-interference-plus-noise ratio (SINR) and Physical (PHY) layer rates. LTE may provide OFDMA and frequency selective scheduling. With respect to capacity, LTE may provide high spatial reuse gains with cell splitting compared to Carrier Sense Multiple Access (CSMA) employed in Wi-Fi. H-ARQ in LTE may provide robustness in an environment with bursty interference. LTE may provide tight interference management with Inter-Cell Interference Coordination (ICIC) and UL power control. A rich pilot structure in LTE enables efficient channel estimation and interference nulling. There may be higher flexibility and interference diversity with carrier aggregation. With respect to mobility and QoS, SON techniques may provide excellent mobility and QoS for hyperdense unplanned network deployments. Other cellular RATs may provide similar advantages over Wi-Fi and other native RATs.

Figure 6:
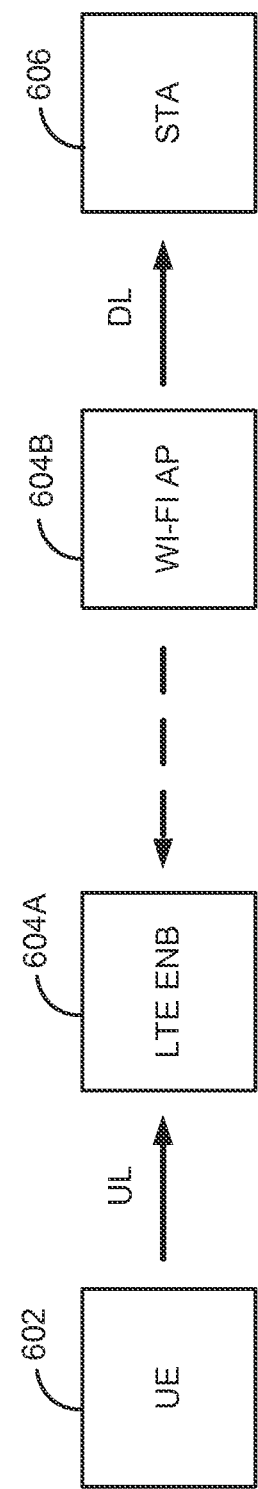
FIG. 6 illustrates an example scenario of mixed-RAT devices operating in the unlicensed band.

FIG. 6 illustrates an example scenario of mixed-RAT devices operating in the unlicensed band and highlights several of the co-existence challenges. As shown, the hidden node problem may present challenges. For example, a device operating on the unlicensed band (e.g., a Wi-Fi device such as an AP 604B or STA 606) hidden from a UE 602 may interfere with the UE 602 (e.g., on the UL). Similar interference may be present on the DL, impacting not only data but also control and acquisition signaling.

To combat such interference scenarios, in accordance with aspects of the disclosure, there are provided methods and techniques for robust operation of user devices in the unlicensed band. For example, the methods and techniques may provide for robust operation on a PCell provided by a base station operating in a standalone mode, where the PCell utilizes a component carrier (PCC) in the unlicensed band. In one aspect, a user device having co-located LTE and Wi-Fi radios, for example (e.g., the user device 500 illustrated in FIG. 5), may trigger a co-located Wi-Fi radio of its corresponding STA (e.g., the co-located Wi-Fi radio 502 of the STA 510), to send a Clear-to-Send-to-Self (CTS2S) or other channel reservation message (e.g., Request-to-Send (RTS) or Clear-to-Send (CTS)) before important events associated with an LTE radio of its corresponding UE (e.g., the LTE radio 504 of the UE 512). Such important events may include acquisition, RACH, a paging message, an indication of a last H-ARQ transmission, a Clear Channel Assessment (CCA), a timing alignment indication, and handling System Information Block (SIB) messages. Important events may also include signaling associated with mobility and handover of the UE. The CTS2S message is a mechanism used by in the IEEE 802.11 wireless networking protocol to reduce frame collisions introduced by the hidden node problem. A device wishing to transmit data may broadcast a CTS2S message. Other nodes receiving the CTS2S message may refrain from transmitting data for a given time period.

As discussed above with reference to the co-located radios of FIGS. 4-5, to enable transmission of the CTS2S message, the user device may include both transmission and reception chains or only the transmission chain (e.g., (e.g., a Wi-Fi transmitter simply providing message transmission). Including only the transmission chain may reduce costs and minimize battery consumption at the device. The CTS2S trigger may be based on interference measurements or based on network instructions. For example, the user device may trigger the CTS2S message if interference is relatively high or is above a predefined threshold, or the network (e.g., via the base station) may direct the user device to send the CTS2S message prior to certain important messages. Transmission of the CTS2S message may not be limited to important messages, however, and may be used anytime the user device determines the CTS2S is needed.

The user device may be configured by a user, the network, or a base station for transmission of the CTS2S message. In one example, the user device may receive parameters from a base station to configure the user device for transmission of the CTS2S message. The parameters may include one or more of a time period to send the CTS2S message, which events (e.g., high priority events) the user device should protect, and a frequency of transmitting the CTS2S message to avoid polluting the channel medium with CTS2S transmissions. Again, the events that may be configured may be high importance or high priority events.

The user device may determine interference based on co-located Wi-Fi radio STA measurements, success of previous system acquisitions, and/or other history data. The CTS2S trigger may be static or dynamically adapted for operation (e.g., based on Wi-Fi interference measurements). Further, the CTS2S trigger may be restricted to a subset of channels to avoid unduly impacting existing Wi-Fi devices and channels that may not be causing the interference. The trigger for the CTS2S at the user device may be based on instructions/configurations from the base station. For example, the base station may take measurements and statistics, and inform the user device on whether to trigger the CTS2S message. The eNB may include such instructions in system information and broadcast messages (e.g., SIB messages).

Figure 7:
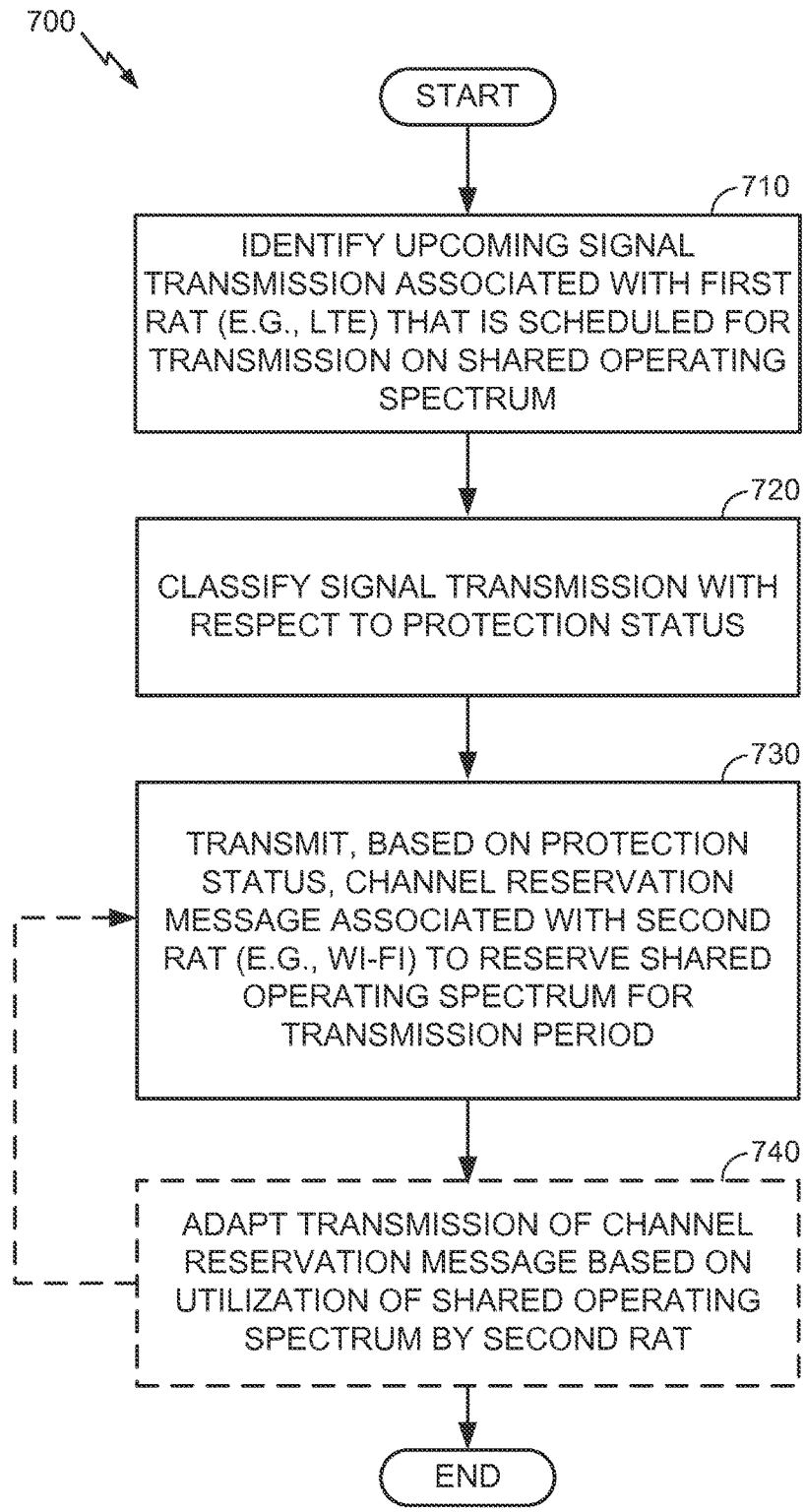
FIG. 7 is a flow diagram illustrating an example method of communication for mitigating interference between RATs sharing operating spectrum in an unlicensed band of radio frequencies.

FIG. 7 is a flow diagram illustrating an example method of communication for mitigating interference between RATs sharing operating spectrum in an unlicensed band of radio frequencies. The method 700 may be performed, for example, by a base station (e.g., the small cell base station 110C illustrated in FIG. 1), by a user device (e.g., the user device 120C illustrated in FIG. 1), or by a combination thereof with different levels or interaction.

In accordance with the techniques and descriptions above, the small cell base station or user device may identify certain upcoming signal transmissions associated with a first RAT (e.g., LTE) that are scheduled for transmission on the shared operating spectrum during a transmission period (block 710). The small cell base station or user device may then classify the signal transmission with respect to a protection status (block 720). The classification may be based on the type of information contained in the signal transmission corresponding to a protected class of transmissions. As discussed in more detail above, such a protected class of transmissions may include, for example, acquisition signals, RACH signals, a last HARQ transmission, a CCA, a paging message, a time alignment indication, a broadcast signal including a SIB, a mobility and handover indication, and so on. In this way, the small cell base station or user device may select certain important transmissions for protection from interference from other RATs (e.g., Wi-Fi) sharing the unlicensed band. While it may be impractical or even detrimental to protect all signaling, the protection of certain signal classes may be advantageous and help ensure proper operation of both RATs.

Returning to FIG. 7, based on the protection status, the small cell base station or user device may transmit a channel reservation message associated with a second RAT (e.g., Wi-Fi) to reserve at least a portion of the shared operating spectrum for at least a portion of the transmission period (block 730). The transmission may be performed via a corresponding (second) transceiver operating in accordance with the second RAT. The second transceiver may be co-located with a first transceiver operating in accordance with the first RAT to send or receive the identified signal transmission. As discussed in more detail above, in this regard the second transceiver may be fully functioning or simply a low-functionality transmission chain. Examples of channel reservation messages that may be used to reserve the shared operating spectrum include CTS2S messages as well as others (e.g., CTS/RTS) or the like, depending on the native RAT sharing the operating spectrum. To avoid unduly hindering operation of the second RAT, the channel reservation message may be transmitted on a subset of channels representing less than all of the channels defined by the second RAT on the unlicensed band (e.g., only on the channel or channels of the second RAT that overlap in frequency space with the operating channel of the first RAT being protected).

In some designs, the use of channel reservation messages to protect important signals may be dynamically adapted based on the utilization of the shared operating spectrum by the native (second) RAT (optional block 740). For example, the small cell base station or user device may additionally monitor, on the shared operating spectrum, signaling that is associated with the second RAT. The monitoring may be performed on a continual, periodic, or event-driven basis as desired. The other-RAT measurements may be obtained at the small cell base station or user device through its own measurements (e.g., via a co-located Wi-Fi radio such as the co-located Wi-Fi radio 402 of the small cell base station 400 or the co-located Wi-Fi radio 502 of the user device 500 having an STA 510), or via a message exchange between the two (e.g., via various feedback signaling). Based on the monitored signaling, the small cell base station or user device may determine a utilization metric for the second RAT and adapt the transmitting of the channel reservation message based on the utilization metric. Thus, in situations where interference is relatively low, the small cell base station may be able to refrain from reserving the channel for itself, and thereby avoid unnecessarily impeding operations of the other RAT.

In addition, the adapting may be further based on the signal that is itself being protected. For example, the adapting may be further based on one or more expected or historical characteristics of the upcoming signal transmission associated with the first RAT. Examples of such expected or historical characteristics include an expected channel quality for receiving the upcoming signal transmission, a receiver proximity, a success or failure history associated with reception of prior signals, a system acquisition history, a transmission period frequency, and so on. In this way, additional protection, for example, may be provided to protect signals that may be weak or have a history of failure.

As discussed above, the method 700 may be performed by a base station (e.g., the small cell base station 110C illustrated in FIG. 1), by a user device (e.g., the user device 120C illustrated in FIG. 1), or by a combination thereof with different levels or interaction. Accordingly, in one example, the identifying (block 710), classifying (block 720), and transmitting (block 730) may be performed by a user device. In this case, the identifying may include, for example, monitoring, at the user device, system information transmitted by a base station, with the classifying including determining the protection status based on the system information. The protection status may be directly indicated by the system information from the base station (e.g., via a message directing the user device to protect certain signals), or indirectly inferred by the user device from the system information from the base station (e.g., via a message identifying a transmission pattern or conveying interference information). In another example, the identifying (block 710), classifying (block 720), and transmitting (block 730) may be performed by a base station. In this case, the identifying may include, for example, querying, at the base station, scheduler information relating to upcoming signaling, with the classifying including determining the protection status based on the scheduler information.

Returning to FIG. 6, the interference may impact in particular coordination and synchronization between the user device 602 and its base station 604A (e.g., by impacting the PSS and SSS signals used for synchronization). In response, the base station 604A may be configured to boost the power for transmitting narrowband signals (including, for example, the PSS or SSS). Averaging the signals (e.g., via Kalman filtering or the like) may also help. The interference may also impact PDCCH performance. In response, the base station 604A may be configured to rely on cross-carrier scheduling to send grants on the PCC, so that the impact may be reduced. Similarly, the PBCH may be sent on the PCC for robustness. The interference may also impact the PDSCH performance. The interference may also impact various measurements (e.g., those taken by the user device 602). For example, Reference Signal Received Power (RSRP) or Reference Signal Received Quality (RSRQ) may be corrupted and/or not reflect Wi-Fi interference correctly.

A Channel Quality Indicator (CQI) mismatch may also arise given that the Cell-specific Reference Signal (CRS) may not capture all Wi-Fi interference.

In more detail, the base station may boost transmission power of narrow band signaling. For example, the PSS/SSS/PBCH signals may be boosted by the base station (e.g., LTE eNB). The signal boost may be adapted based on CQI patterns of existing user devices, Network Listen Module (NLM) measurements, Radio Link Failure (RLF) statistics, PDSCH/PDCCH Packet Error Rates (PER) of associated user devices, and other historical or statistical measures.

In addition or as an alternative, the number of OFDM symbols used for certain signaling (e.g., PDCCH) may be controlled based on similar measurements. For example, the number of OFDM symbols may be increased to add further redundancy and, hence, decoding opportunities, to increase the robustness of such signaling.

The PDSCH, for example, which may also have a narrow allowed bandwidth, may be power boosted for UEs suffering from high Wi-Fi interference (subject to Power Spectral Density (PSD) limitations). Rate control may be similarly provided by adapting a termination target and CQI-to-MCS (Modulation and Coding Scheme) mapping based on CQI statistics and PER.

On the PUSCH, PCC channel selection may be made from a small pool of channels, in addition to narrow band assignment, which may be sufficient to reduce the impact of Wi-Fi interference.

During acquisition, PSS and SSS detection may be improved by boosting transmission power. PSS and SSS may be narrowband (e.g., 1 MHz) signals and hence the base station may boost the transmit power up to the PSD emission limits (e.g., 17 dBm/MHz in a high band). They may also be adapted based on NLM, CQI pattern of active user devices, RLF statistics, etc. For example, if a combination of these statistics indicates relatively high interference or one or more statistics are higher than predefined thresholds, then the transmission power may be boosted. Hysteresis may be added to the design for determining when to boost or reduce the transmission power, to prevent undue system oscillation between transmission power levels. The noise power may be estimated for one or more samples, and then the process may normalize each half frame by the noise power before accumulating (which may be a Kalman-like function). As discussed in more detail above, before the user device starts the connection setup, the co-located STA (e.g., the co-located STA 510 and its Wi-Fi radio 502) may selectively send a sequence of CTS2S to stop nearby Wi-Fi transmissions. A Low-Noise Amplifier (LNA) may be adapted based on measurements across acquisition trials. Measurements for Wi-Fi interference and duty cycle may be made to properly set the LNA gain before acquisition starts.

Further, PBCH may also be a narrowband (e.g., 1 MHz) channel and hence the base station may boost the transmit power up to the PSD emission limits (e.g., 17 dBm/MHz in a high band). The power boost may be adapted based on CQI patterns of existing user devices, NL measurements, RLF statistics, PDSCH/PDCCH PER of associated user devices, etc. A Transmission Time Interval (TTI) may be configured for providing time diversity. For example, a 40 ms TTI (4 bursts) may provide the time diversity. Inverse noise estimates in each burst may be used in the soft combining to avoid using corrupted PBCH bursts.

Control channels may be improved through the methods and techniques disclosed. For DL control, a base station may be configured to control channel transmission power and the number OFDM symbols used based on measurements. The control may be adapted based on CQI patterns on the PCC, measurement reports, RLF statistics, NL measurements, etc. The PUCCH may be a narrowband signal and on a channel edge, hence, the PUCCH may not suffer a significant interference from Wi-Fi transmissions. The PUCCH power control may take care of interference over thermal noise (IoT) rise at the base station due to interference from nearby Wi-Fi devices. PUCCH closed loop power control may provide additional bias based on base station NL measurements, PUCCH PER, etc.

For data channels, the PDSCH may be adjusted as follows. Narrow bandwidth allocation and power boosting for user devices may be made for user devices suffering from high Wi-Fi interference. The PDSCH may be scheduled on the SCC if the PCC is impacted. For rate control, the termination target and CQI-to-MCS mapping may be adapted based on CQI statistics and PER. As an example, in the presence of a nearby jammer, the CQI pattern may exhibit a bi-modal characteristic (good and bad CQI), and the duty cycle of the interference may be inferred from the frequency of the bad CQI. Based on the good CQI, bad CQI, and interference duty cycle, the rate loop filtering of the then-received CQI may be changed.

For the PUSCH, the PCC channel selection may be made from a small pool of channels, in addition to narrow band assignment, and this may be sufficient to reduce the impact of Wi-Fi interference.

For the RACH, parameters may be adapted for boosting power. For example, the parameters max_transmission_counter and power_ramp_step may be adapted based on (e.g., Wi-Fi) interference. The base station may configure a power offset and power ramping based on NL and Wi-Fi interference measured at the base station. Narrow band PRACH transmission may provide extra processing gains. Adaptation parameters may be made similar to previous values, and based on a channel quality metric. A maximum number of Message3 H-ARQ transmissions may be set based on NL measurements. The user device may selectively send CTS2S messages before RACH procedures start and protect the RACH procedure.

For idle mode users, the user device may be configured to wake up earlier for a given page and send a CTS2S frame to protect the paging time.

Figure 8:
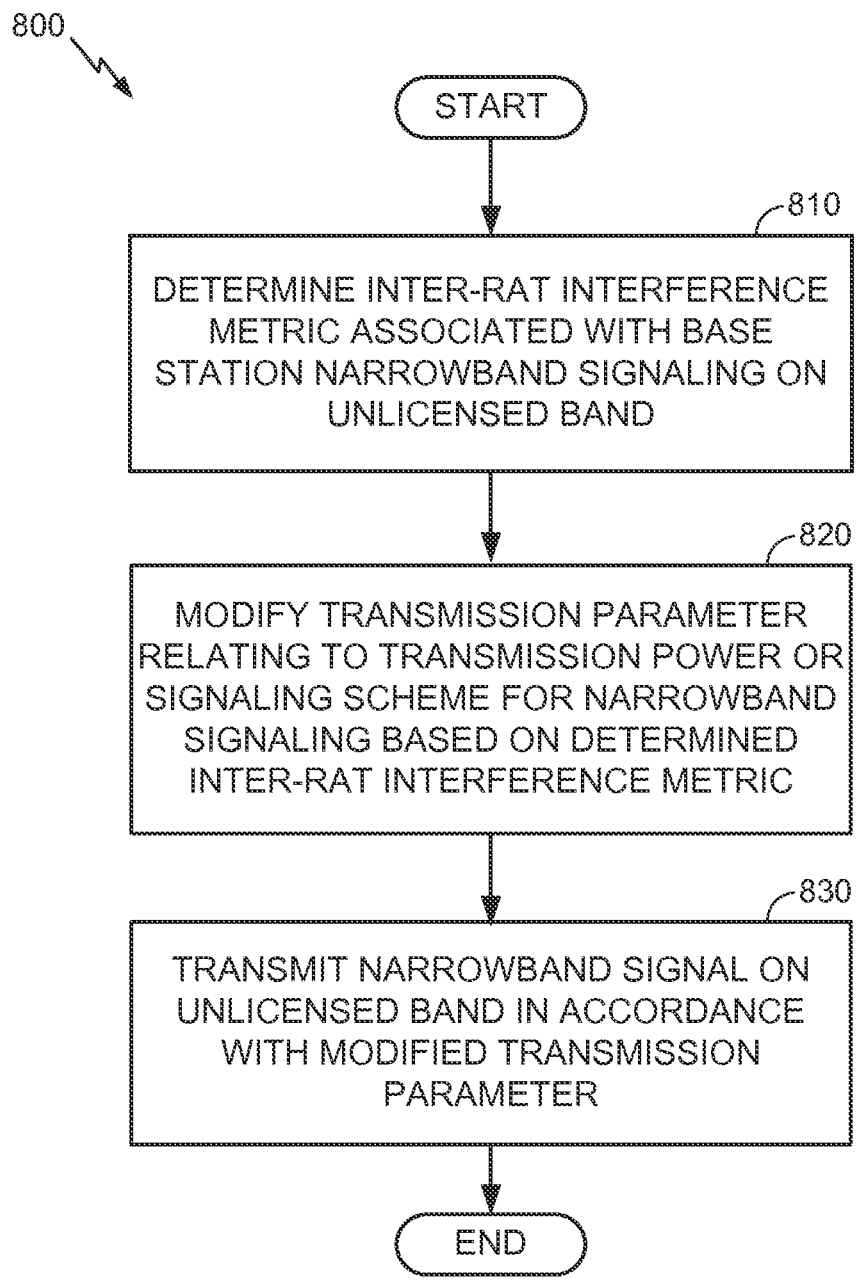
FIG. 8 is a flow diagram illustrating another example method of communication for mitigating interference between RATs sharing operating spectrum in an unlicensed band of radio frequencies.

FIG. 8 is a flow diagram illustrating another example method of communication for mitigating interference between RATs sharing operating spectrum in an unlicensed band of radio frequencies. The method 800 may be performed, for example, by a base station (e.g., the small cell base station 110C illustrated in FIG. 1).

In accordance with the techniques and descriptions above, the small cell base station may determine an inter-RAT interference metric associated with base station narrowband signaling on the unlicensed band (block 810). The determination may be performed on a continual, periodic, or event-driven basis as desired. The inter-RAT interference metric may be used to characterize the interference experienced on the unlicensed band by a first RAT (e.g., LTE) due to the shared spectrum operations of a second RAT (e.g., Wi-Fi).

The inter-RAT interference metric may accordingly be determined in various ways, including both indirectly, via measurements of first RAT signaling, and directly, via measurements of second RAT signaling (e.g., via one or more co-located transceivers). For example, as discussed above, the inter-RAT interference metric may be determined from measurements relating to CQI statistics, RLF statistics, or PER statistics for transmissions in accordance with the RAT associated with the narrowband signaling being provided by the small cell base station (e.g., LTE signaling provided by an LTE small cell base station). As another example, the inter-RAT interference metric may be determined from measurements relating to transmissions in accordance with a RAT other than the one associated with the narrow band signaling (e.g., measurements of nearby Wi-Fi device activity). The other-RAT measurements may be obtained at the small cell base station through its own measurements (e.g., via a co-located Wi-Fi radio such as the co-located Wi-Fi radio 402 of the small cell base station 400), or through measurements received from at least one associated user device (e.g., a user device such as the user device 500 having an STA 510 and co-located Wi-Fi radio 502, which may feedback various signaling measurements to the small cell base station 560).

Returning to FIG. 8, based on the determined inter-RAT interference metric, the small cell base station may modify a transmission parameter relating to a transmission power or signaling scheme for narrowband signaling (block 820). For example, the small cell base station may boost the transmission power based on the inter-RAT interference metric indicating a high level of interference (e.g., above a threshold). In addition or as an alternative, the small cell base station may increase the redundancy of the signaling scheme (e.g., by utilizing more OFDM frames) based on the inter-RAT interference metric indicating a high level of interference (e.g., above a threshold). In either case, boosting the transmission power and/or the signaling redundancy may help to protect the narrowband signaling from interference and increase the robustness or likelihood of successful transmission to associated user devices.

The small cell base station may then continue to transmit one or more subsequent narrowband signals on the unlicensed band in accordance with the modified transmission parameter (block 830). As discussed in more detail above, the narrowband signaling that may be adapted in this way to unlicensed band operation includes various acquisition, control, and data channels. The transmission parameter adaption is particularly useful for more important signaling, such as those signals associated with operation of a PCell provided by the small cell base station when operating in a standalone mode on the unlicensed band (i.e., where the corresponding PCC is in the unlicensed band and hence subject to inter-RAT interference). As an example, the narrowband signal being protected may comprise an acquisition signal corresponding to a PSS, an SSS, a PBCH, or the like. As another example, the narrowband signal may comprise a control signal corresponding to a PDCCH, PUCCH, PRACH, or the like. As another example, the narrowband signal may comprise a data signal corresponding to a PDSCH, a PUSCH, or the like.

Returning to FIG. 6, in another aspect, Kalman filters may be used for improving signals received in the unlicensed band. The Kalman filter, also known as a linear quadratic estimation filter, may use a series of signals received over time to produce a more accurate estimate of the signals. On the unlicensed band, interference may not be averaged to produce improved signals. For example, in a group of four received signals on the unlicensed band, two of the signals may be corrupted so that averaging the values may not produce suitable signals. In this case, it may be beneficial to use Kalman filters. The Kalman type filters, when combining the same signals across time, may avoid using corrupted received signals.

Figure 9:
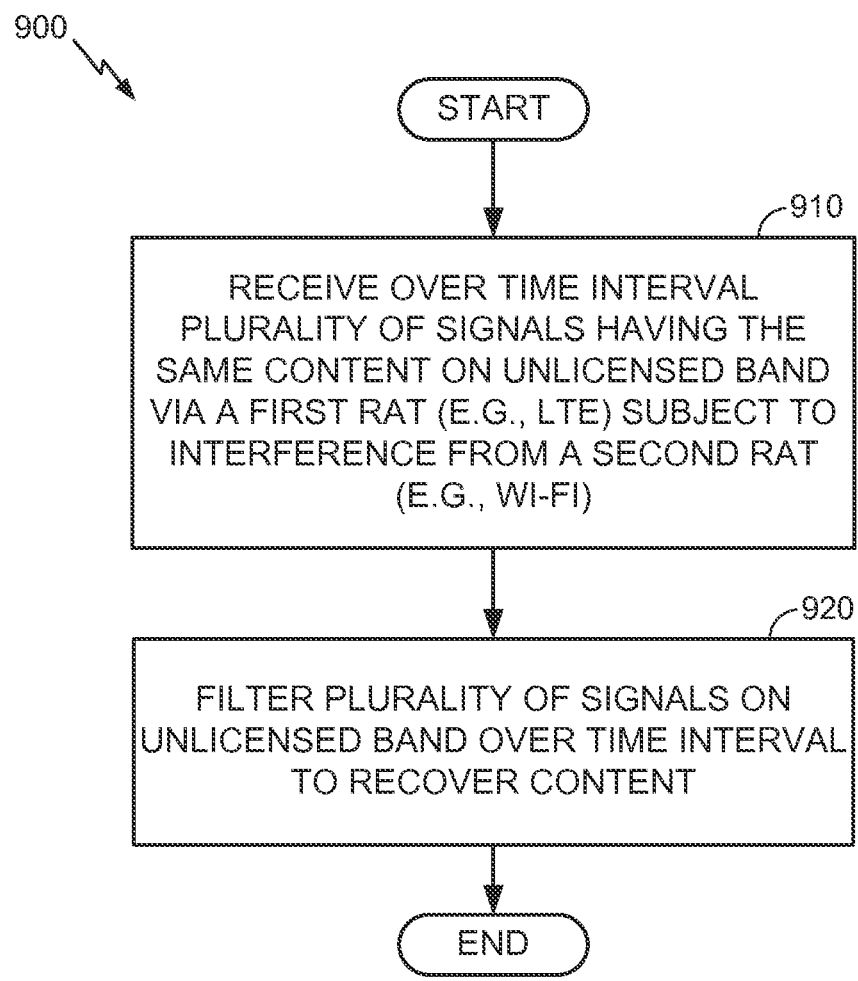
FIG. 9 is a flow diagram illustrating another example method of communication for mitigating interference between RATs sharing operating spectrum in an unlicensed band of radio frequencies.

FIG. 9 is a flow diagram illustrating another example method of communication for mitigating interference between RATs sharing operating spectrum in an unlicensed band of radio frequencies. The method 900 may be performed, for example, by a base station (e.g., the small cell base station 110C illustrated in FIG. 1), by a user device (e.g., the user device 120C illustrated in FIG. 1), or by a combination thereof with different levels of interaction.

In accordance with the techniques and descriptions above, the small cell base station or user device may receive a plurality of signals having the same content on the unlicensed band via a first RAT (e.g., LTE) subject to interference from a second RAT (e.g., Wi-Fi) (block 910). The plurality of signals may be received over a time interval. To recover the content of the plurality of signals, the small cell base station or user device may filter (e.g., using Kalman filtering) the plurality of signals on the unlicensed band over the time interval (block 920). The filtering may include, for example, weighting a corrupted signal among the plurality of signals at a reduced factor compared to a non-corrupted signal among the plurality of signals.

Returning again to FIG. 6, in yet another aspect, fractional frequency reuse (FFR) of the PUCCH may provide advantages. In an FFR scenario, a cell may be divided into two or more regions, such as an inner region (serving cell center user devices) and an outer region (serving cell edge user devices). Different frequency bands and/or resource blocks associated with sets of symbol-tones may be allocated to each region. Multiple resource block allocations may be used, with some resource blocks may be dedicated to cell edge user devices, and other resource block allocations dedicated to cell center user devices. For example, this may be used to compensate for the user device transmit power dynamic range compression, which may be inherent from the Wi-Fi RF Integrated Circuit (IC). FFR in the PUCCH may improve transmissions between the base station and user device in case of low dynamic range in the transmit chain at the user device due to a shared Wi-Fi RFIC.

Accordingly, by allocating different frequency bands and/or resource blocks associated with respective sets of symbol-tones to user devices in different regions, which are disparately impacted by transmit power dynamic range compression, a Wi-Fi RF front end may be more effectively utilized for other-RAT (e.g., LTE) communication on the unlicensed band in that the typical interference caused by the inherent limitations of transmit power dynamic range compression may be avoided. In particular, the relatively high UL transmission power of cell center users (which are prevented from operating at lower transmission powers, even though they may be sustainable) may be isolated from the relatively low UL transmission power of cell edge users, which would otherwise be drowned out at the base station receiver. Repurposing Wi-Fi RF circuitry for LTE devices to use in operating on the unlicensed band may provide a more cost effective approach to unlicensed band operation than fabricating new LTE-specific hardware, especially in view of the techniques above for mitigating potential drawbacks.

Figure 10:
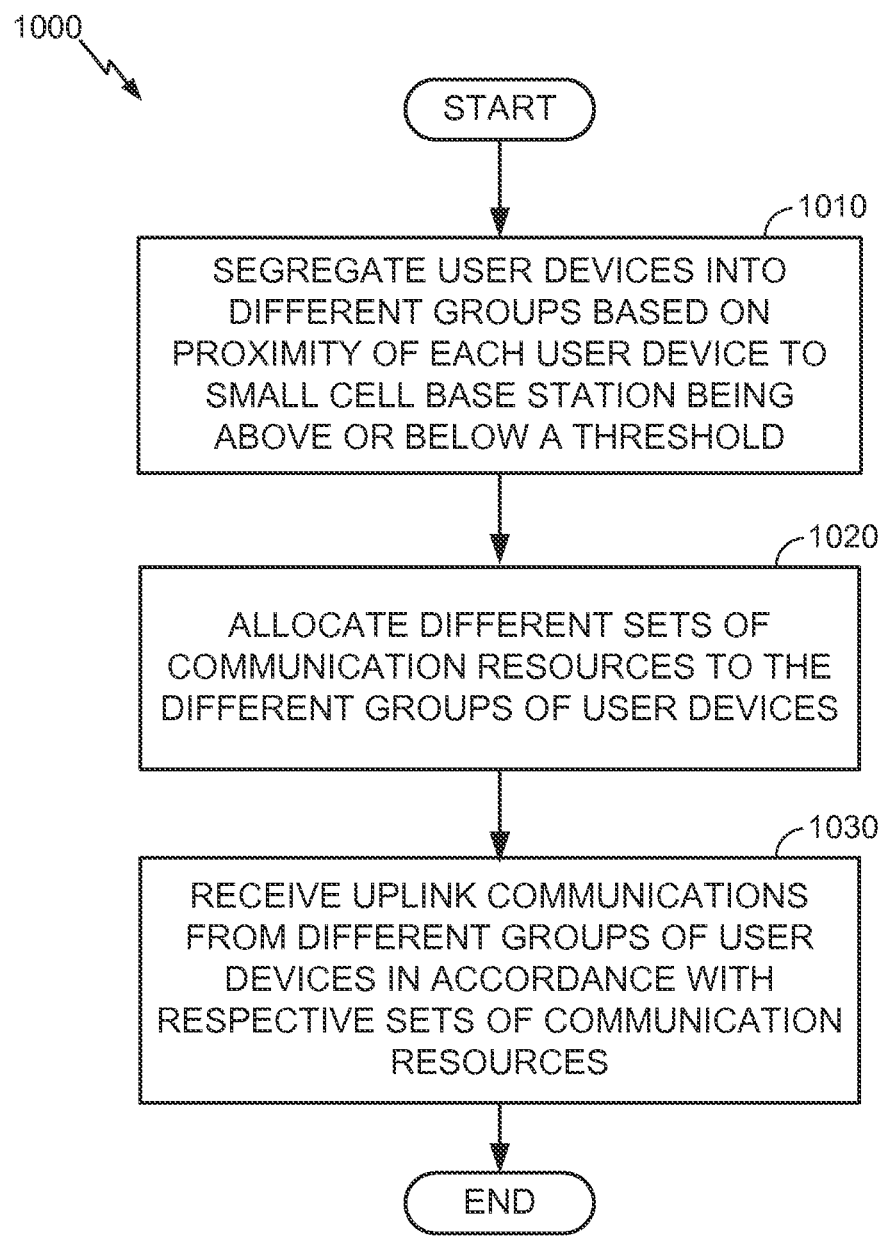
FIG. 10 is a flow diagram illustrating an example method of mitigating interference among a plurality of user devices operating in an unlicensed band of radio frequencies.

FIG. 10 is a flow diagram illustrating an example method of mitigating interference among a plurality of user devices operating in an unlicensed band of radio frequencies. The method 1000 may be performed, for example, by a base station (e.g., the small cell base station 110C illustrated in FIG. 1).

In accordance with the techniques and descriptions above, the small cell base station may segregate the plurality of user devices into a first group of user devices and a second group of user devices based on a proximity of each user device to the small cell base station being above or below a threshold (block 1010). As discussed above in more detail, one of the first or second groups of user devices may correspond to cell edge users and the other of the first or second groups of user devices may correspond to cell center users. Cell edge and cell center users will be disparately impacted by transmit power limitations such as those inherent in the repurposing of Wi-Fi front end transceiver circuitry for LTE communications on the unlicensed band.

The small cell base station may then allocate (i) a first set of communication resources to the first group of user devices and (ii) a second set of communication resources to the second group of user devices (block 1020). As further discussed above, the first and second sets of communication resources may comprise, for example, frequency bands or resource blocks associated with respective symbol-tones. The first and second set of communication resources may be non-overlapping to prevent interference between the two groups. In accordance with the first and second sets of communication resources, the small cell base station may receive uplink communications from the first and second groups of user devices, respectively (block 1030).

Indirectly or directly (e.g., when such information is known or otherwise available), the segregating (block 1010) may be further based on a technology type associated with front end transceiver circuitry utilized by each user device. The technology type may have a transmission power limitation that is different from a native technology type with which the small cell base station operates, which again may disparately impact different user devices and lead to artificial interference problems. In particular, the native technology type with which the small cell base station operates may correspond to LTE technology and at least one of the plurality of user devices may operate in accordance with LTE technology, but via front end transceiver circuitry associated with Wi-Fi technology.

Figure 11:
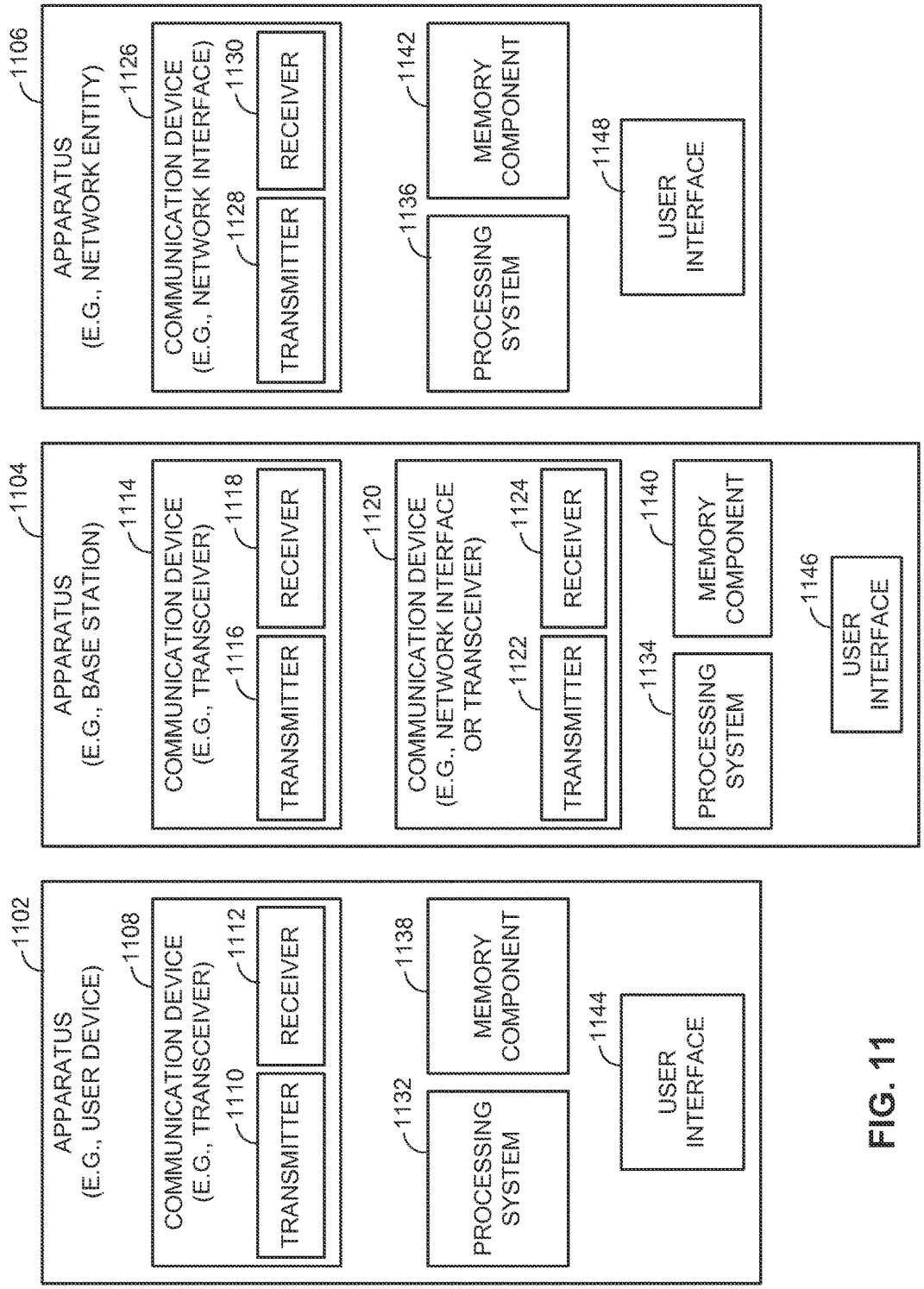
FIG. 11 is a simplified block diagram of several sample aspects of components that may be employed in communication nodes and configured to support communication as taught herein.

FIG. 11 illustrates several sample components (represented by corresponding blocks) that may be incorporated into an apparatus 1102, an apparatus 1104, and an apparatus 1106 (corresponding to, for example, a user device, a base station, and a network entity, respectively) to support the co-existence operations as taught herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 1102 and the apparatus 1104 each include at least one wireless communication device (represented by the communication devices 1108 and 1114 (and the communication device 1120 if the apparatus 1104 is a relay)) for communicating with other nodes via at least one designated RAT. Each communication device 1108 includes at least one transmitter (represented by the transmitter 1110) for transmitting and encoding signals (e.g., messages, indications, information, and so on) and at least one receiver (represented by the receiver 1112) for receiving and decoding signals (e.g., messages, indications, information, pilots, and so on). Similarly, each communication device 1114 includes at least one transmitter (represented by the transmitter 1116) for transmitting signals (e.g., messages, indications, information, pilots, and so on) and at least one receiver (represented by the receiver 1118) for receiving signals (e.g., messages, indications, information, and so on). If the apparatus 1104 is a relay station, each communication device 1120 may include at least one transmitter (represented by the transmitter 1122) for transmitting signals (e.g., messages, indications, information, pilots, and so on) and at least one receiver (represented by the receiver 1124) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 1104 may also comprise a Network Listen Module (NLM) or the like for performing various measurements.

The apparatus 1106 (and the apparatus 1104 if it is not a relay station) includes at least one communication device (represented by the communication device 1126 and, optionally, 1120) for communicating with other nodes. For example, the communication device 1126 may comprise a network interface that is configured to communicate with one or more network entities via a wire-based or wireless backhaul. In some aspects, the communication device 1126 may be implemented as a transceiver configured to support wire-based or wireless signal communication. This communication may involve, for example, sending and receiving: messages, parameters, or other types of information. Accordingly, in the example of FIG. 11, the communication device 1126 is shown as comprising a transmitter 1128 and a receiver 1130. Similarly, if the apparatus 1104 is not a relay station, the communication device 1120 may comprise a network interface that is configured to communicate with one or more network entities via a wire-based or wireless backhaul. As with the communication device 1126, the communication device 1120 is shown as comprising a transmitter 1122 and a receiver 1124.

The apparatuses 1102, 1104, and 1106 also include other components that may be used in conjunction with the co-existence operations as taught herein. The apparatus 1102 includes a processing system 1132 for providing functionality relating to, for example, user device operations to support co-existence as taught herein and for providing other processing functionality. The apparatus 1104 includes a processing system 1134 for providing functionality relating to, for example, base station operations to support co-existence as taught herein and for providing other processing functionality. The apparatus 1106 includes a processing system 1136 for providing functionality relating to, for example, network operations to support co-existence as taught herein and for providing other processing functionality. The apparatuses 1102, 1104, and 1106 include memory components 1138, 1140, and 1142 (e.g., each including a memory device), respectively, for maintaining information (e.g., information indicative of reserved resources, thresholds, parameters, and so on). In addition, the apparatuses 1102, 1104, and 1106 include user interface devices 1144, 1146, and 1148, respectively, for providing indications (e.g., audible and/or visual indications) to a user and/or for receiving user input (e.g., upon user actuation of a sensing device such a keypad, a touch screen, a microphone, and so on).

For convenience, the apparatuses 1102, 1104, and/or 1106 are shown in FIG. 11 as including various components that may be configured according to the various examples described herein. It will be appreciated, however, that the illustrated blocks may have different functionality in different designs.

The components of FIG. 11 may be implemented in various ways. In some implementations, the components of FIG. 11 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1108, 1132, 1138, and 1144 may be implemented by processor and memory component(s) of the apparatus 1102 (e.g., by execution of appropriate code and/or by appropriate configuration of processor components). Similarly, some or all of the functionality represented by blocks 1114, 1120, 1134, 1140, and 1146 may be implemented by processor and memory component(s) of the apparatus 1104 (e.g., by execution of appropriate code and/or by appropriate configuration of processor components). Also, some or all of the functionality represented by blocks 1126, 1136, 1142, and 1148 may be implemented by processor and memory component(s) of the apparatus 1106 (e.g., by execution of appropriate code and/or by appropriate configuration of processor components).

Figure 12:
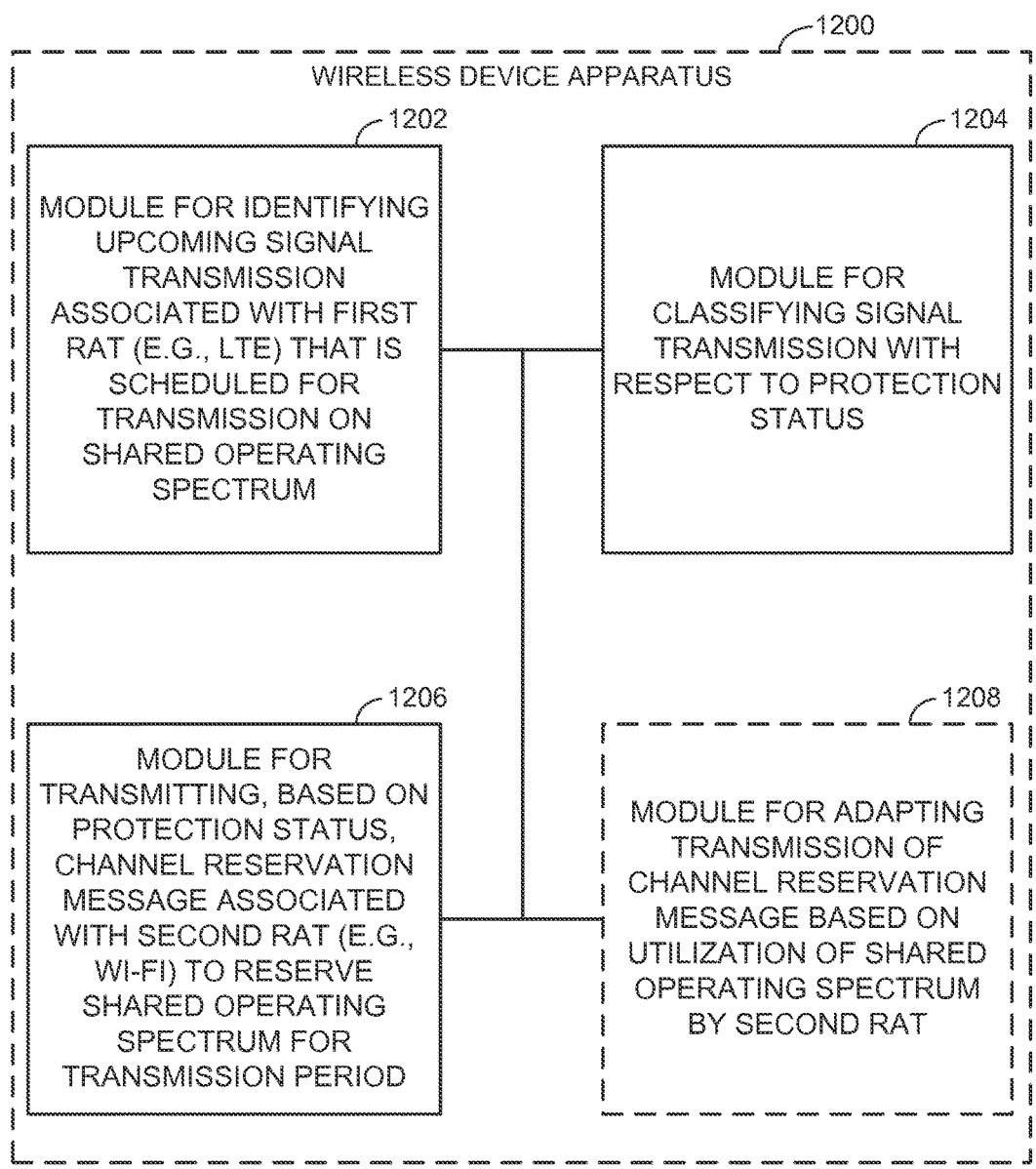
FIGS. 12-15 are other simplified block diagrams of several sample aspects of apparatuses configured to support communication as taught herein.

FIG. 12 illustrates an example wireless device apparatus 1200 represented as a series of interrelated functional modules. A module for identifying 1202 may correspond at least in some aspects to, for example, a processing system as discussed herein. A module for classifying 1204 may correspond at least in some aspects to, for example, a processing system as discussed herein. A module for transmitting 1206 may correspond at least in some aspects to, for example, a communication device as discussed herein. An optional module for adapting 1208 may correspond at least in some aspects to, for example, a processing system as discussed herein.

Figure 13:
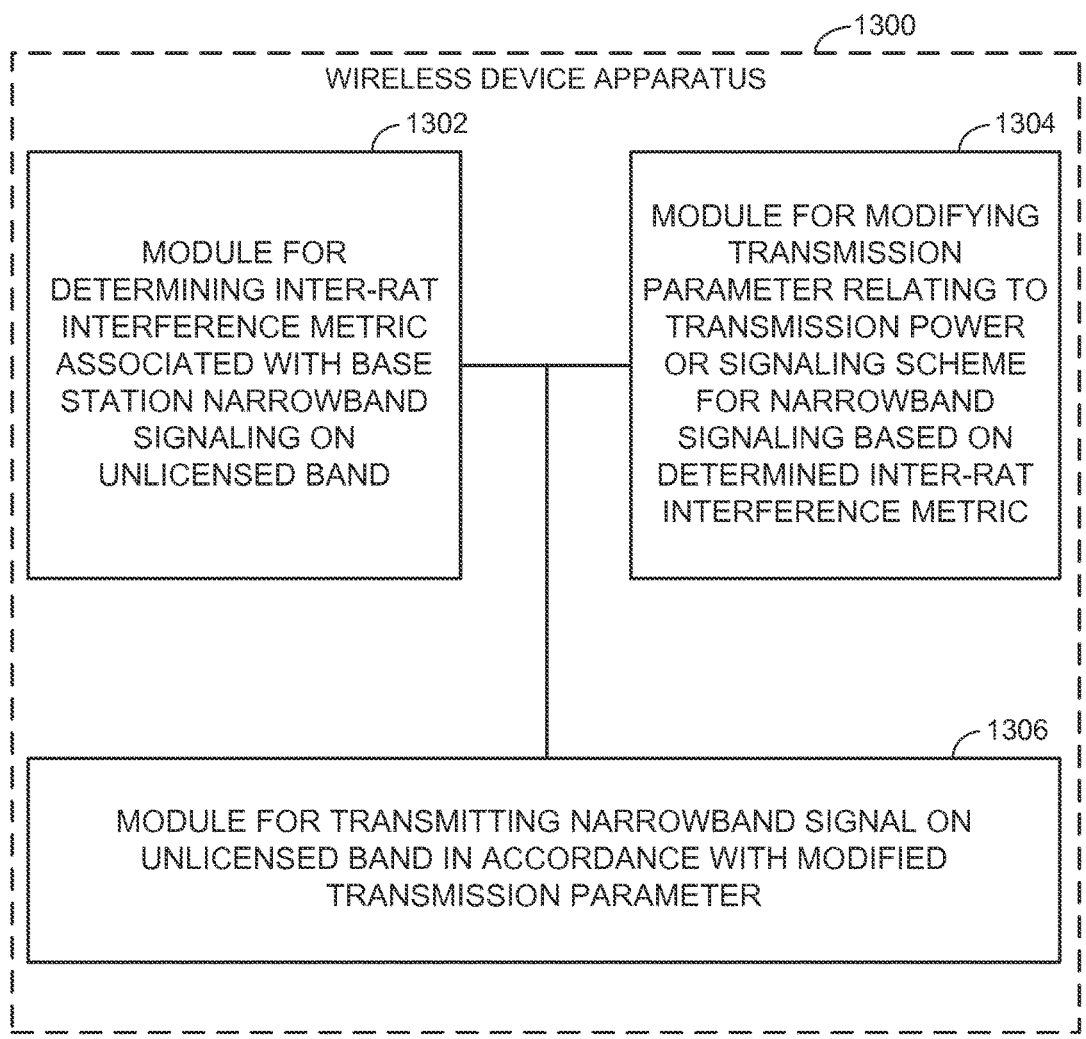

FIG. 13 illustrates an example wireless device apparatus 1300 represented as a series of interrelated functional modules. A module for determining 1302 may correspond at least in some aspects to, for example, a processing system as discussed herein. A module for modifying 1304 may correspond at least in some aspects to, for example, a processing system as discussed herein. A module for transmitting 1306 may correspond at least in some aspects to, for example, a communication device as discussed herein.

Figure 14:
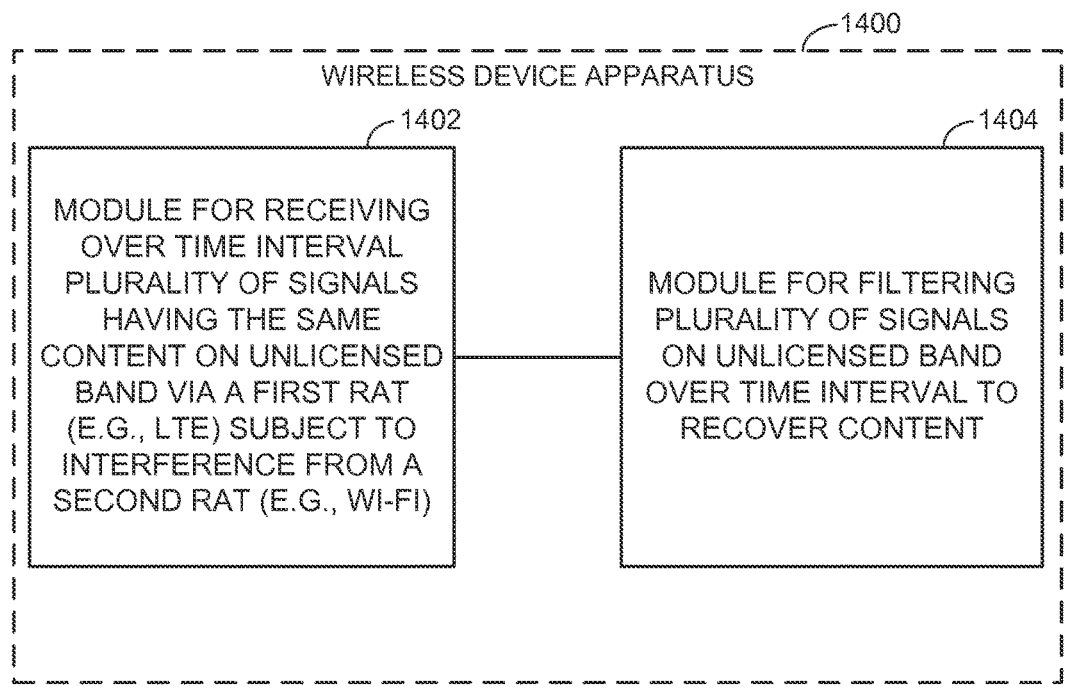

FIG. 14 illustrates an example wireless device apparatus 1400 represented as a series of interrelated functional modules. A module for receiving 1402 may correspond at least in some aspects to, for example, a communication device as discussed herein. A module for filtering 1404 may correspond at least in some aspects to, for example, a processing system as discussed herein.

Figure 15:
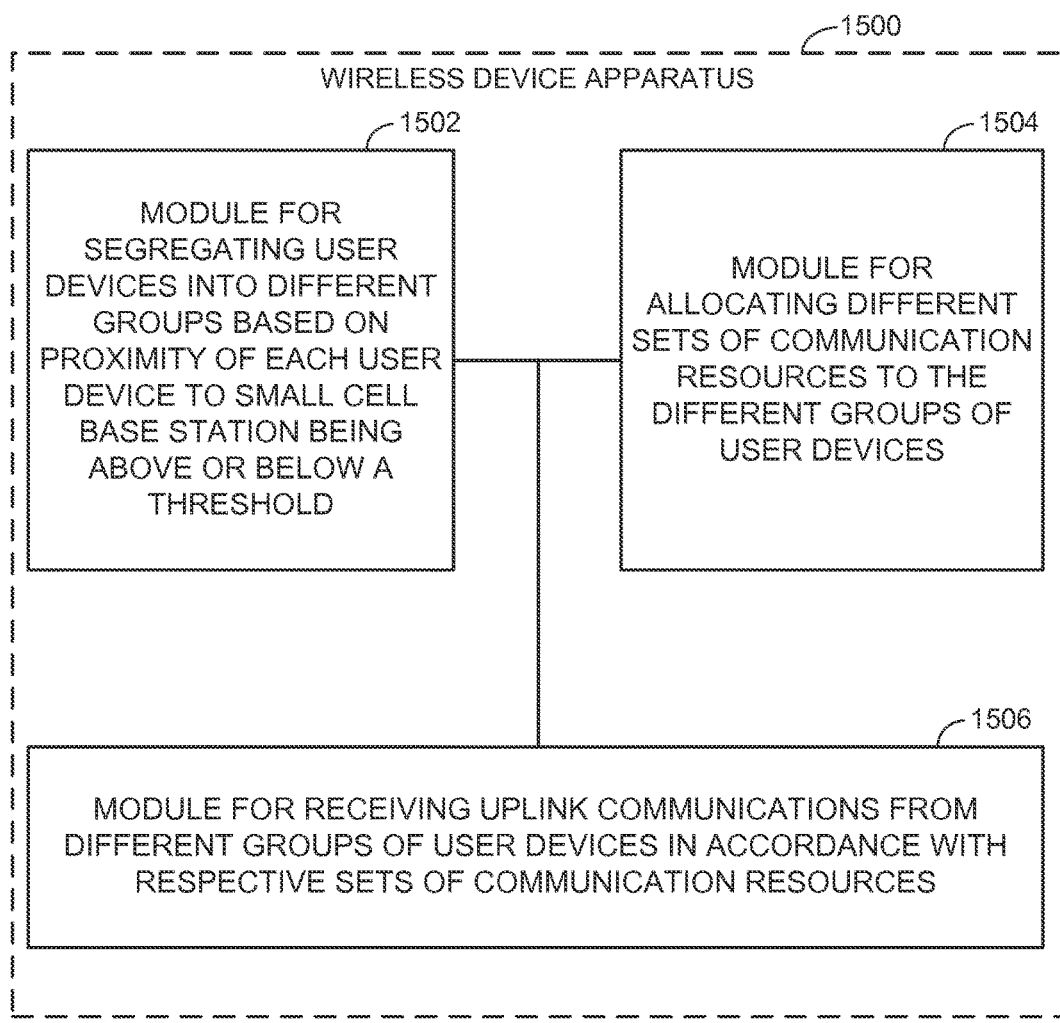

FIG. 15 illustrates an example wireless device apparatus 1500 represented as a series of interrelated functional modules. A module for segregating 1502 may correspond at least in some aspects to, for example, a processing system as discussed herein. A module for allocating 1504 may correspond at least in some aspects to, for example, a processing system in conjunction with a communication device as discussed herein. A module for receiving 1506 may correspond at least in some aspects to, for example, a communication device as discussed herein.

The functionality of the modules of FIGS. 12-15 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 12-15, as well as other components and functions described herein, may be implemented using any suitable means. Such means also may be implemented, at least in part, using corresponding structure as taught herein. For example, the components described above in conjunction with the "module for" components of FIGS. 12-15 also may correspond to similarly designated "means for" functionality. Thus, in some aspects one or more of such means may be implemented using one or more of processor components, integrated circuits, or other suitable structure as taught herein.

Figure 16:
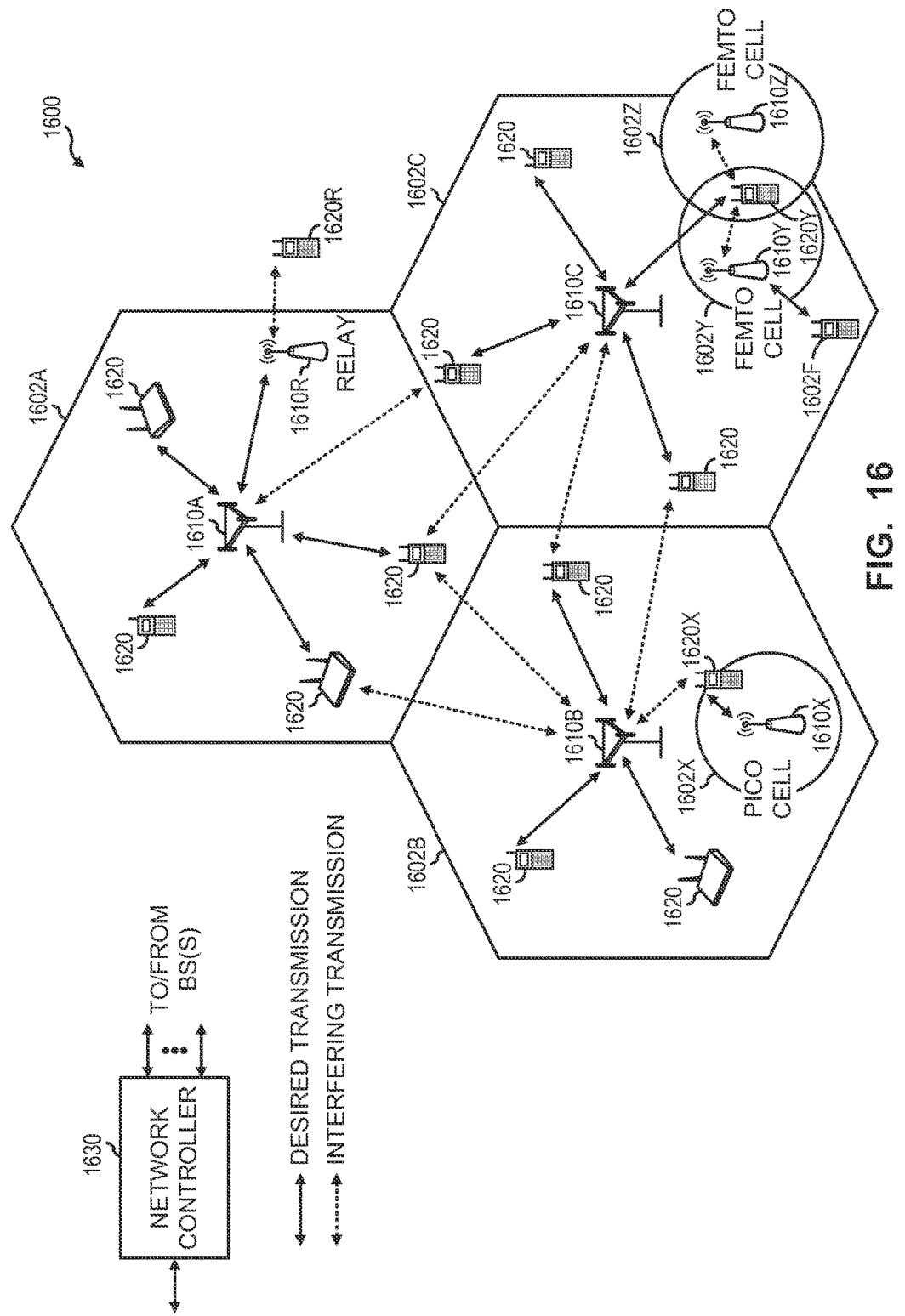
FIG. 16 illustrates an example communication system environment in which the teachings and structures herein may be may be incorporated.

FIG. 16 illustrates an example communication system environment in which the co-existence teachings and structures herein may be may be incorporated. The wireless communication system 1600, which will be described at least in part as an LTE network for illustration purposes, includes a number of eNBs 1610 and other network entities. Each of the eNBs 1610 provides communication coverage for a particular geographic area, such as macro cell or small cell coverage areas.

In the illustrated example, the eNBs 1610A, 1610B, and 1610C are macro cell eNBs for the macro cells 1602A, 1602B, and 1602C, respectively. The macro cells 1602A, 1602B, and 1602C may cover a relatively large geographic area (e.g., several kilometers in radius) and may allow unrestricted access by UEs with service subscription. The eNB 1610X is a particular small cell eNB referred to as a pico cell eNB for the pico cell 1602X. The pico cell 1602X may cover a relatively small geographic area and may allow unrestricted access by UEs with service subscription. The eNBs 1610Y and 1610Z are particular small cells referred to as femto cell eNBs for the femto cells 1602Y and 1602Z, respectively. The femto cells 1602Y and 1602Z may cover a relatively small geographic area (e.g., a home) and may allow unrestricted access by UEs (e.g., when operated in an open access mode) or restricted access by UEs having association with the femto cell (e.g., UEs in a Closed Subscriber Group (CSG), UEs for users in the home, etc.), as discussed in more detail below.

The wireless network 1600 also includes a relay station 1610R. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs (e.g., a mobile hotspot). In the example shown in FIG. 16, the relay station 1610R communicates with the eNB 1610A and a UE 1620R in order to facilitate communication between the eNB 1610A and the UE 1620R. A relay station may also be referred to as a relay eNB, a relay, etc.

The wireless network 1600 is a heterogeneous network in that it includes eNBs of different types, including macro eNBs, pico eNBs, femto eNBs, relays, etc. As discussed in more detail above, these different types of eNBs may have different transmit power levels, different coverage areas, and different impacts on interference in the wireless network 1600. For example, macro eNBs may have a relatively high transmit power level whereas pico eNBs, femto eNBs, and relays may have a lower transmit power level (e.g., by a relative margin, such as a 10 dBm difference or more).

Returning to FIG. 16, the wireless network 1600 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. Unless otherwise noted, the techniques described herein may be used for both synchronous and asynchronous operation.

A network controller 1630 may couple to a set of eNBs and provide coordination and control for these eNBs. The network controller 1630 may communicate with the eNBs 1610 via a backhaul. The eNBs 1610 may also communicate with one another, e.g., directly or indirectly via a wireless or wireline backhaul.

As shown, the UEs 1620 may be dispersed throughout the wireless network 1600, and each UE may be stationary or mobile, corresponding to, for example, a cellular phone, a personal digital assistant (PDA), a wireless modem, a wireless communication device, a handheld device, a laptop computer, a cordless phone, a wireless local loop (WLL) station, or other mobile entities. In FIG. 16, a solid line with double arrows indicates desired transmissions between a UE and a serving eNB, which is an eNB designated to serve the UE on the downlink and/or uplink. A dashed line with double arrows indicates potentially interfering transmissions between a UE and an eNB. For example, UE 1620Y may be in proximity to femto eNBs 1610Y, 1610Z. Uplink transmissions from UE 1620Y may interfere with femto eNBs 1610Y, 1610Z. Uplink transmissions from UE 1620Y may jam femto eNBs 1610Y, 1610Z and degrade the quality of reception of other uplink signals to femto eNBs 1610Y, 1610Z.

Small cell eNBs such as the pico cell eNB 1610X and femto eNBs 1610Y, 1610Z may be configured to support different types of access modes. For example, in an open access mode, a small cell eNB may allow any UE to obtain any type of service via the small cell. In a restricted (or closed) access mode, a small cell may only allow authorized UEs to obtain service via the small cell. For example, a small cell eNB may only allow UEs (e.g., so called home UEs) belonging to a certain subscriber group (e.g., a CSG) to obtain service via the small cell. In a hybrid access mode, alien UEs (e.g., non-home UEs, non-CSG UEs) may be given limited access to the small cell. For example, a macro UE that does not belong to a small cell's CSG may be allowed to access the small cell only if sufficient resources are available for all home UEs currently being served by the small cell.

By way of example, femto eNB 1610Y may be an open-access femto eNB with no restricted associations to UEs. The femto eNB 1610Z may be a higher transmission power eNB initially deployed to provide coverage to an area. Femto eNB 1610Z may be deployed to cover a large service area. Meanwhile, femto eNB 1610Y may be a lower transmission power eNB deployed later than femto eNB 1610Z to provide coverage for a hotspot area (e.g., a sports arena or stadium) for loading traffic from either or both eNB 1610C, eNB 1610Z.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for mitigating interference between Radio Access Technologies (RATs) sharing operating spectrum in an unlicensed band of radio frequencies.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of communication for mitigating interference between Radio Access Technologies (RATs) sharing operating spectrum in an unlicensed band of radio frequencies, the method comprising:
    identifying an upcoming signal transmission associated with a first RAT, wherein the signal transmission is scheduled for transmission on the shared operating spectrum during a transmission period;
    classifying the signal transmission with respect to a protection status, wherein the classifying is based on the type of information contained in the signal transmission corresponding to a protected class of transmissions; and
    transmitting over the shared operating spectrum, based on the protection status, a channel reservation message associated with a second RAT to reserve at least a portion of the shared operating spectrum for at least a portion of the transmission period.

2. The method of claim 1, wherein:
    the first RAT comprises Long Term Evolution (LTE) technology; and
    the second RAT comprises Wi-Fi technology.

3. The method of claim 1, wherein the transmitting is performed via a second transceiver operating in accordance with the second RAT, the second transceiver being co-located with a first transceiver operating in accordance with the first RAT to send or receive the identified signal transmission.

4. The method of claim 1, wherein the channel reservation message comprises at least one of a Clear-to-Send-to-Self (CTS2S) message, a Request-to-Send (RTS) message, or a Clear-to-Send (CTS) message defined by the second RAT.

5. The method of claim 1, wherein the channel reservation message is transmitted on a subset of channels representing less than all of the channels defined by the second RAT on the unlicensed band.

6. The method of claim 1, wherein the protected class of transmissions comprises at least one of: acquisition signals, Random Access Channel (RACH) signals, a last Hybrid Automatic Repeat Request (HARQ) transmission, a Clear Channel Assessment (CCA), a paging message, a time alignment indication, a broadcast signal including a System Information Block (SIB), a mobility and handover indication, or a combination thereof.

7. The method of claim 1, further comprising:
    monitoring, on the shared operating spectrum, signaling that is associated with the second RAT;
    determining a utilization metric for the second RAT based on the monitored signaling; and
    adapting the transmitting of the channel reservation message based on the utilization metric.

8. The method of claim 7, wherein the adapting is further based on one or more expected or historical characteristics of the upcoming signal transmission associated with the first RAT.

9. The method of claim 8, wherein the one or more expected or historical characteristics comprise at least one of: an expected channel quality for receiving the upcoming signal transmission, a receiver proximity, a success or failure history associated with reception of prior signals, a system acquisition history, a transmission period frequency, or a combination thereof.

10. The method of claim 1, wherein the identifying, classifying, and transmitting are performed by a user device, and wherein:
    the identifying comprises monitoring, at the user device, system information transmitted by a base station, and
    the classifying comprises determining the protection status based on the system information.

11. The method of claim 10, wherein the protection status is directly indicated by the system information from the base station.

12. The method of claim 10, wherein the protection status is indirectly inferred by the user device from the system information from the base station.

13. The method of claim 1, wherein the identifying, classifying, and transmitting are performed by a base station, and wherein:
    the identifying comprises querying, at the base station, scheduler information relating to upcoming signaling, and
    the classifying comprises determining the protection status based on the scheduler information.

14. An apparatus for communication for mitigating interference between Radio Access Technologies (RATs) sharing operating spectrum in an unlicensed band of radio frequencies, the apparatus comprising:
    a processor configured to identify an upcoming signal transmission associated with a first RAT, wherein the signal transmission is scheduled for transmission on the shared operating spectrum during a transmission period, and to classify the signal transmission with respect to a protection status, wherein the processor is configured to classify the signal transmission based on the type of information contained in the signal transmission corresponding to a protected class of transmissions; and
    a transceiver configured to transmit over the shared operating spectrum, based on the protection status, a channel reservation message associated with a second RAT to reserve at least a portion of the shared operating spectrum for at least a portion of the transmission period.

15. The apparatus of claim 14, wherein:
    the first RAT comprises Long Term Evolution (LTE) technology; and
    the second RAT comprises Wi-Fi technology.

16. The apparatus of claim 14, wherein the transceiver is a second transceiver operating in accordance with the second RAT, the second transceiver being co-located with a first transceiver operating in accordance with the first RAT to send or receive the identified signal transmission.

17. The apparatus of claim 14, wherein the channel reservation message comprises at least one of a Clear-to-Send-to-Self (CTS2S) message, a Request-to-Send (RTS) message, or a Clear-to-Send (CTS) message defined by the second RAT.

18. The apparatus of claim 14, wherein the transceiver is configured to transmit the channel reservation message on a subset of channels representing less than all of the channels defined by the second RAT on the unlicensed band.

19. The apparatus of claim 14, wherein the protected class of transmissions comprises at least one of: acquisition signals, Random Access Channel (RACH) signals, a last Hybrid Automatic Repeat Request (HARQ) transmission, a Clear Channel Assessment (CCA), a paging message, a time alignment indication, a broadcast signal including a System Information Block (SIB), a mobility and handover indication, or a combination thereof.

20. The apparatus of claim 14, wherein the processor is further configured to:
monitor, on the shared operating spectrum, signaling that is associated with the second RAT;
determine a utilization metric for the second RAT based on the monitored signaling; and
adapt the transmitting of the channel reservation message based on the utilization metric.

21. The apparatus of claim 20, wherein the processor is configured to adapt the transmitting based further on one or more expected or historical characteristics of the upcoming signal transmission associated with the first RAT.

22. The apparatus of claim 21, wherein the one or more expected or historical characteristics comprise at least one of: an expected channel quality for receiving the upcoming signal transmission, a receiver proximity, a success or failure history associated with reception of prior signals, a system acquisition history, a transmission period frequency, or a combination thereof.

23. The apparatus of claim 14, wherein the processor and the transceiver correspond to a user device, and wherein:
the processor is configured to identify the signal transmission by monitoring, at the user device, system information transmitted by a base station, and
the processor is configured to classify the signal transmission by determining the protection status based on the system information.

24. The apparatus of claim 23, wherein the protection status is directly indicated by the system information from the base station.

25. The apparatus of claim 23, wherein the protection status is indirectly inferred by the user device from the system information from the base station.

26. The apparatus of claim 14, wherein the processor and the transceiver correspond to a base station, and wherein:
the processor is configured to identify the signal transmission by querying, at the base station, scheduler information relating to upcoming signaling, and
the processor is configured to classify the signal transmission by determining the protection status based on the scheduler information.

27. An apparatus for communication for mitigating interference between Radio Access Technologies (RATs) sharing operating spectrum in an unlicensed band of radio frequencies, the apparatus comprising:
means for identifying an upcoming signal transmission associated with a first RAT, wherein the signal transmission is scheduled for transmission on the shared operating spectrum during a transmission period;
means for classifying the signal transmission with respect to a protection status, wherein the means for classifying classifies the signal transmission based on the type of information contained in the signal transmission corresponding to a protected class of transmissions; and
means for transmitting over the shared operating spectrum, based on the protection status, a channel reservation message associated with a second RAT to reserve at least a portion of the shared operating spectrum for at least a portion of the transmission period.

28. A non-transitory computer-readable medium comprising instructions, which, when executed by a processor, cause the processor to perform operations for mitigating interference between Radio Access Technologies (RATs) sharing operating spectrum in an unlicensed band of radio frequencies, the non-transitory computer-readable medium comprising:
instructions for identifying an upcoming signal transmission associated with a first RAT, wherein the signal transmission is scheduled for transmission on the shared operating spectrum during a transmission period;
instructions for classifying the signal transmission with respect to a protection status, wherein the instructions for classifying classify the signal transmission based on the type of information contained in the signal transmission corresponding to a protected class of transmissions; and
instructions for transmitting over the shared operating spectrum, based on the protection status, a channel reservation message associated with a second RAT to reserve at least a portion of the shared operating spectrum for at least a portion of the transmission period.

* * * * *